(12) United States Patent
Mori et al.

(10) Patent No.: US 6,307,685 B1
(45) Date of Patent: *Oct. 23, 2001

(54) ZOOM LENS

(75) Inventors: Nobuyoshi Mori; Masae Sato, both of Hachioji (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,329

(22) Filed: Aug. 31, 1998

(30) Foreign Application Priority Data

Sep. 2, 1997 (JP) .................................................. 9-237044
Mar. 3, 1998 (JP) ................................................. 10-050637

(51) Int. Cl.⁷ ..................................................... G02B 15/14
(52) U.S. Cl. ............................................. 359/690; 359/683
(58) Field of Search .................................. 359/690, 687, 359/683, 676

(56) References Cited

U.S. PATENT DOCUMENTS

| | | | |
|---|---|---|---|
| 4,451,124 | * | 5/1984 | Basista .................................. 359/687 |
| 5,257,135 | * | 10/1993 | Kohno et al. ......................... 359/689 |
| 5,745,301 | * | 4/1998 | Betensky et al. ..................... 359/689 |

FOREIGN PATENT DOCUMENTS

| | | |
|---|---|---|
| 64-79716 | 3/1989 | (JP) . |
| 2-291515 | 12/1990 | (JP) . |
| 3-89309 | 4/1991 | (JP) . |
| 4-106512 | 4/1992 | (JP) . |
| 4-307509 | 10/1992 | (JP) . |
| 5-203875 | 8/1993 | (JP) . |
| 8-271788 | 10/1996 | (JP) . |

* cited by examiner

Primary Examiner—Jordan M. Schwartz
(74) Attorney, Agent, or Firm—Finnegan, Henderson, Farabow, Garrett & Dunner, L.L.P.

(57) ABSTRACT

A zoom lens includes, in the order named from an object side: a first lens group having a positive focal length; a second lens group having a negative focal length; and a third lens group having a positive focal length.

A magnification is changed by moving said second and third lens groups in an optical axis direction of said zoom lens, and satisfies the following condition, $$3.0 < Lt/(L\sqrt{Z}) < 6.0$$

where Lt represents a distance between a lens surface closest to the object side of said first lens group and an image plane, L represents a diagonal length of the image plane, and Z represents a variable magnification ratio showing a ratio of a focal length at a wide angle end to a focal length at a telephoto end.

36 Claims, 25 Drawing Sheets

Fno=2.8

SPHERICAL ABERRATION

ω=30.6°

ASTIGMATISM

ω=30.6°

DISTORTION

Fno=2.99

SPHERICAL ABERRATION

ω=18.8°

ASTIGMATISM

ω=18.8°

DISTORTION

Fno=3.18

SPHERICAL ABERRATION

ω=11.4°

ASTIGMATISM

ω=11.4°

DISTORTION

Fno=2.8
SPHERICAL ABERRATION

ω=28.7°
ASTIGMATISM

ω=28.7°
DISTORTION

Fno=2.96
SPHERICAL ABERRATION

ω=17.4°
ASTIGMATISM

ω=17.4°
DISTORTION

Fno=3.04
SPHERICAL ABERRATION

ω=10.6°
ASTIGMATISM

ω=10.6°
DISTORTION

Fno=2.8

-0.1 0 0.1
SPHERICAL ABERRATION

ω=28.9°

-0.1 0 0.1
ASTIGMATISM

ω=28.9°

-5 0 5%
DISTORTION

Fno=2.99

-0.1 0 0.1
SPHERICAL ABERRATION

ω=18.0°

-0.1 0 0.1
ASTIGMATISM

ω=18.0°

-5 0 5%
DISTORTION

Fno=3.23

-0.1 0 0.1
SPHERICAL ABERRATION

ω=10.5°

-0.1 0 0.1
ASTIGMATISM

ω=10.5°

-5 0 5%
DISTORTION

Fno=2.8

-0.1  0  0.1
SPHERICAL ABERRATION

ω=28.9°

-0.1  0  0.1
ASTIGMATISM

ω=28.9°

-5  0  5%
DISTORTION

Fno=2.96

-0.1  0  0.1
SPHERICAL ABERRATION

ω=18.0°

-0.1  0  0.1
ASTIGMATISM

ω=18.0°

-5  0  5%
DISTORTION

Fno=3.04

-0.1  0  0.1
SPHERICAL ABERRATION

ω=10.5°

-0.1  0  0.1
ASTIGMATISM

ω=10.5°

-5  0  5%
DISTORTION

Fno=2.8
d-LINE
g-LINE

-0.1  0  0.1
SPHERICAL
ABERRATION

ω=25.3°
S  M

-0.1  0  0.1
ASTIGMATISM

ω=25.3°

-5  0  5%
DISTORTION

Fno=3.00
d-LINE
g-LINE

-0.1  0  0.1
SPHERICAL
ABERRATION

ω=15.5°
S  M

-0.1  0  0.1
ASTIGMATISM

ω=15.5°

-5  0  5%
DISTORTION

Fno=3.20
d-LINE
g-LINE

-0.1  0  0.1
SPHERICAL
ABERRATION

ω=9.0°
S  M

-0.1  0  0.1
ASTIGMATISM

ω=9.0°

-5  0  5%
DISTORTION

Fno=2.8

SPHERICAL ABERRATION

ω=27.7°

ASTIGMATISM

ω=27.7°

DISTORTION

Fno=3.00

SPHERICAL ABERRATION

ω=17.1°

ASTIGMATISM

ω=17.1°

DISTORTION

Fno=3.27

SPHERICAL ABERRATION

ω=10.0°

ASTIGMATISM

ω=10,0°

DISTORTION

Fno=2.8

SPHERICAL ABERRATION

ω=27.7°

ASTIGMATISM

ω=27.7°

DISTORTION

Fno=3.01

SPHERICAL ABERRATION

ω=16.8°

ASTIGMATISM

ω=16.8°

DISTORTION

Fno=3.19

SPHERICAL ABERRATION

ω=10.0°

ASTIGMATISM

ω=10,0°

DISTORTION

Fno=2.88

-0.1  0  0.1
SPHERICAL ABERRATION

ω=29.5°

-0.1  0  0.1
ASTIGMATISM

ω=29.5°

-5  0  5%
DISTORTION

Fno=3.12

-0.1  0  0.1
SPHERICAL ABERRATION

ω=13.9°

-0.1  0  0.1
ASTIGMATISM

ω=13.9°

-5  0  5%
DISTORTION

Fno=3.07

-0.1  0  0.1
SPHERICAL ABERRATION

ω=6.5°

-0.1  0  0.1
ASTIGMATISM

ω=6.5°

-5  0  5%
DISTORTION

Fno=2.88

-0.1 0 0.1
SPHERICAL ABERRATION

ω=29.5°

-0.1 0 0.1
ASTIGMATISM

ω=29.5°

-5 0 5%
DISTORTION

Fno=3.11

-0.1 0 0.1
SPHERICAL ABERRATION

ω=13.9°

-0.1 0 0.1
ASTIGMATISM

ω=13.9°

-5 0 5%
DISTORTION

Fno=3.08

-0.1 0 0.1
SPHERICAL ABERRATION

ω=6.5°

-0.1 0 0.1
ASTIGMATISM

ω=6.5°

-5 0 5%
DISTORTION

Fno=2.65

-0.1  0  0.1
SPHERICAL
ABERRATION

ω=34°

-0.1  0  0.1
ASTIGMATISM

ω=34°

-5  0  5%
DISTORTION

Fno=2.95

-0.1  0  0.1
SPHERICAL
ABERRATION

ω=20.5°

-0.1  0  0.1
ASTIGMATISM

ω=20.5°

-5  0  5%
DISTORTION

Fno=3.5

-0.1  0  0.1
SPHERICAL
ABERRATION

ω=12.5°

-0.1  0  0.1
ASTIGMATISM

ω=12.5°

-5  0  5%
DISTORTION

Fno=2.8

SPHERICAL ABERRATION

ω=34°

ASTIGMATISM

ω=34°

DISTORTION

Fno=3.2

SPHERICAL ABERRATION

ω=20.5°

ASTIGMATISM

ω=20.5°

DISTORTION

Fno=4.1

SPHERICAL ABERRATION

ω=12.5°

ASTIGMATISM

ω=12.5°

DISTORTION

Fno=2.80

-0.1  0  0.1
SPHERICAL ABERRATION

ω=33.9°

-0.1  0  0.1
ASTIGMATISM

ω=33.9°

-5  0  5%
DISTORTION

Fno=3.06

-0.1  0  0.1
SPHERICAL ABERRATION

ω=20.8°

-0.1  0  0.1
ASTIGMATISM

ω=20.8°

-5  0  5%
DISTORTION

Fno=3.52

-0.1  0  0.1
SPHERICAL ABERRATION

ω=12.5°

-0.1  0  0.1
ASTIGMATISM

ω=12.5°

-5  0  5%
DISTORTION

ZOOM LENS

BACKGROUND OF THE INVENTION

The present invention relates to a zoom lens, and specifically to a zoom lens having a variable magnification ratio from about 2.5 to 6, which is appropriate for an electronic still camera, video camera, or similar device, using a solid-state image sensor such as a CCD, or the like.

Recently, the development of software to process image data is remarkable with the technological advance or the spread of a personal computer, and a demand for an electronic still camera, used for image reading into a personal computer, increases.

As a zoom lens for a solid-state image sensor, conventionally, the zoom lens of a 3-group composition or 4-group composition is disclosed. As a zoom lens for a video camera, it has a tendency toward high variable magnification, and the zoom lens of 4-group composition is widely used. As a zoom lens for an electronic still camera, high resolution and high image quality are required, and the zoom lens having about 3 times-variable magnification ratio, which is a ratio of the focal length at the wide angle end and that at the telephoto end, is widely used, and 3-group composition is also disclosed for the zoom lens having about 3 times-variable magnification ratio.

Conventionally, the following are disclosed for the zoom lens having 3-group composition: Japanese Patent Publication Open to Public Inspection Nos. 79716/1989, 291515/1990, 89309/1991, 106512/1992, 307509/1992, 203875/1993, 271788/1996, etc.

However, in these conventional examples, there is a problem that the overall length of the lens is long in proportion to its variable magnification ratio in a zoom lens in which zooming is conducted by moving the second lens group and the third lens group, in a 3-group lens composed of positive, negative, and positive lens groups. Further, distortion at the wide angle end exceeds about −5%; the distortion is small, but the overall length of the lens is too large; or correction of the spherical aberration or astigmatism is insufficient.

Further, in the zoom lens whose aberration is sufficiently corrected, in order to have about 3 times-variable magnification ratio, cost is higher because it is necessary that the number of component lenses is 11–12, or many aspherical glass lenses whose production cost is relatively high, are used.

Further, in an example in which priority is given to cost reduction, all lenses are made of plastic, and variable magnification ratio is made large, therefore, there are problems in that the overall length of the lens is extremely increased, and it is necessary to compensate for the influence of temperature variation by any method except for lens, or because many aspherical surfaces are used, the sensitivity of performance deterioration, caused by eccentricity of the lens, is high, and assembling becomes difficult.

SUMMARY OF THE INVENTION

The present invention is accomplished in view of the foregoing problems, and an object of the present invention is to provide a zoom lens whose overall length is reduced while its variable magnification ratio is kept, without deteriorating the aberration, and further, to provide a digital still camera, video camera, etc., having the zoom lens. Another object of the present invention is to provide a compact zoom lens in which the number of component lenses is not more than 10, and various aberrations including distortion at the wide angle end, spherical aberration, or the like, is completely corrected, and which has a variable magnification ratio of 2.5 times or more.

Further object of the present invention is to provide a zoom lens in which, although it is compact and has the fewer number of component lenses, the performance deterioration due to lens eccentricity is smaller, and assembling operations are easy.

Still further object of the present invention is to provide a compact zoom lens in which plastic lenses are effectively used, and influence due to temperature variation is smaller, and which is inexpensive and has high performance.

The above objects can be attained by one of the following structures. That is, a zoom lens, which has a first lens group having a positive focal length, a second lens group having a negative focal length, and a third lens group having a positive focal length; in which in the order from an object side, the first lens group, the second lens group, and the third lens group are provided, and no other lens group is provided, and at the variable magnification, the second lens group and the third lens group are moved in the direction of optical axis; and which satisfies the following condition (0);

$$3.0 < Lt/(L\sqrt{Z}) < 6.0 \tag{0}$$

where, Lt represents a distance from a lens surface located closest to the object side of the first lens group, to the image plane; L represents a diagonal length of the image plane; and Z represents a variable magnification ratio which is a ratio of the focal length at the wide angle end to that at the telephoto end of the zoom lens.

In this connection, when the upper limit of the condition (0) is exceeded, the overall length of the lens is too long, which is not desirable. When the condition (0) is lower than its lower limit, the refracting power of each lens group is increased, and correction of each aberration is difficult, which is not desirable.

Generally, a diagonal length of the image plane can be considered to be almost the same as that of a portion of an image sensor, or can be unconditionally determined by a field angle and the focal length. That is, a lens of the present invention is a zoom lens which has at least 3 lens groups of, in the order from an object side, the first lens group having a positive focal length; the second lens group having a negative focal length; and the third lens group having a positive focal length, and which conducts variable magnification by moving the second lens group and the third lens group, wherein the zoom lens satisfies the following condition, $$0.60 < (\beta_{2T}/\beta_{2W}) \cdot (\beta_{3W}/\beta_{3T}) < 4.0 \tag{1}$$

where $\beta_{2T}$ represents a lateral magnification of the second lens group at a telephoto end, $\beta_{2W}$ represents a lateral magnification of the second lens group at a wide angle end, $\beta_{3T}$ represents a lateral magnification of the third lens group at the telephoto end, and $\beta_{3W}$ represents a lateral magnification of the third lens group at the wide angle end, and wherein a variable magnification ratio representing a ratio of a focal length at the wide angle end to a focal length at the telephoto end, is not less than 2.5.

Further, a zoom lens which has at least 3 lens groups of, in the order from an object side, the first lens group having a positive focal length; the second lens group having a negative focal length; and the third lens group having a positive focal length, and which conducts variable magnification by moving the second lens group and the third lens group, wherein the zoom lens satisfies the following conditions, $$0.60 < (\beta_{2T}/\beta_{2W}) \cdot (\beta_{3W}/\beta_{3T}) < 1.2 \qquad (2)$$

$$30° < \omega_W \qquad (3)$$

where $\beta_{2T}$ represents a lateral magnification of the second lens group at a telephoto end, $\beta_{2W}$ represents a lateral magnification of the second lens group at a wide angle end, $\beta_{3T}$ represents a lateral magnification of the third lens group at the telephoto end, and $\beta_{3W}$ represents a lateral magnification of the third lens group at the wide angle end, and $\omega_W$ represents a half field angle at the wide angle end.

Still further, the third lens group includes at least 3 lenses and at least one negative lens, and at least one surface of which is aspherical.

Further, a zoom lens which has at least 3 lens groups of, in the order from an object side, the first lens group having a positive focal length; the second lens group having a negative focal length; and the third lens group having a positive focal length, and which conducts variable magnification by moving the second lens group and the third lens group, wherein the zoom lens satisfies the following conditions, $$1.4 < (\beta_{2T}/\beta_{2W}) \cdot (\beta_{3W}/\beta_{3T}) < 4.0 \qquad (4)$$

$$\omega_T < 10° \qquad (5)$$

where $\beta_{2T}$ represents a lateral magnification of the second lens group at a telephoto end, $\beta_{2W}$ represents a lateral magnification of the second lens group at a wide angle end, $\beta_{3T}$ represents a lateral magnification of the third lens group at the telephoto end, $\beta_{3W}$ represents a lateral magnification of the third lens group at the wide angle end, and $\omega_T$ represents a half field angle at the telephoto end.

Further, the following conditions are satisfied:

$$0.75 < (\beta_{2T}/\beta_{2W}) \cdot (\beta_{3W}/\beta_{3T}) < 4.0 \qquad (6)$$

$$-0.77 < \beta_{3T} < -0.42 \qquad (7)$$

$$0.1 < f_W/f_1 < 0.22 \qquad (8)$$

where $f_1$ represents a focal length of the first lens group, and $f_W$ represents a focal length of an overall system of the zoom lens.

Further, a zoom lens which has at least 3 lens groups of, in the order from an object side, the first lens group having a positive focal length; the second lens group having a negative focal length; and the third lens group having a positive focal length, and which conducts variable magnification by moving the second lens group and the third lens group, wherein the zoom lens satisfies the following conditions, $$-0.69 < \beta_{3T} < -0.38 \qquad (9)$$

$$1.0 < (\beta_{2T}/\beta_{2W}) \cdot (\beta_{3W}/\beta_{3T}) < 4.0 \qquad (10)$$

where $\beta_{2T}$ represents a lateral magnification of the second lens group at a telephoto end, $\beta_{2W}$ represents a lateral magnification of the second lens group at a wide angle end, $\beta_{3T}$ represents a lateral magnification of the third lens group at the telephoto end, and $\beta_{3W}$ represents a lateral magnification of the third lens group at the wide angle end, and wherein a variable magnification ratio representing a ratio of a focal length at the wide angle end to a focal length at the telephoto end, is not less than 2.5.

Further, the zoom lens is structured so that the following conditions are satisfied: when a focal length of the first lens group is $f_1$, a focal length of the second lens group is $f_2$, a focal length of the third lens group is $f_3$, and a focal length of an overall system at a wide angle end is $f_W$, $$0.12 < f_W/f_1 < 0.25 \qquad (11)$$

$$-0.9 < f_W/f_2 < -0.4 \qquad (12)$$

$$2.5 < f_1/f_3 < 4.0. \qquad (13)$$

More desirably, the first lens group comprises a negative meniscus lens and at least one positive lens in the order from an object side; the second lens group comprises two negative lenses and one positive lens in the order from an object side; and the third lens group comprises a positive lens, a negative lens, and at least one positive lens in the order from an object side.

More desirably, a zoom lens which has at least 3 lens groups of, in the order from an object side, the first lens group having a positive focal length; the second lens group having a negative focal length; and the third lens group having a positive focal length, and which conducts variable magnification by moving the second lens group and the third lens group, wherein the zoom lens satisfies the following conditions, $$-0.65 < \beta_{3T} < -0.4 \qquad (9')$$

$$1.2 < (\beta_{2T}/\beta_{2W}) \cdot (\beta_{3W}/\beta_{3T}) < 3.0 \qquad (10')$$

where $\beta_{2T}$ represents a lateral magnification of the second lens group at a telephoto end, $\beta_{2W}$ represents a lateral magnification of the second lens group at a wide angle end, $\beta_{3T}$ represents a lateral magnification of the third lens group at the telephoto end, and $\beta_{3W}$ represents a lateral magnification of the third lens group at the wide angle end, and wherein a variable magnification ratio representing a ratio of a focal length at the wide angle end to a focal length at the telephoto end, is not less than 2.5.

More desirably, when a focal length of the first lens group is $f_1$, a focal length of the second lens group is $f_2$, a focal length of the third lens group is $f_3$, and a focal length of an overall system at a wide angle end is $f_W$, the zoom lens satisfies the following conditions:

$$0.13 < f_W/f_1 < 0.22 \qquad (11)$$

$$-0.82 < f_W/f_2 < -0.5 \qquad (12)$$

$$2.8 < f_1/f_3 < 3.7. \qquad (13)$$

Alternatively, a zoom lens which has at least 3 lens groups of, in the order from an object side, the first lens group having a positive focal length; the second lens group having a negative focal length; and the third lens group having a positive focal length, and which conducts variable magnification by moving the second lens group and the third lens group, wherein the zoom lens is structured so that the third lens group includes a (3-a)th lens sub-group in which a positive lens and a negative lens are cemented together, and a (3-b)th lens sub-group having a positive refracting power, which is provided adjacent to the (3-a)th lens sub-group on the image side, and wherein the (3-b)th lens sub-group has at least one positive lens.

More desirably, at least one surface of the (3-a)th lens sub-group is aspherical.

More desirably, all of the (3-a)th lens sub-group are made of plastic lenses, and the following condition is satisfied:

$$|f_W/f_{3-a}| 0.06 \qquad (14)$$

where $f_{3-a}$ represents a focal length of the (3-a)th lens sub-group, and $f_W$ represents a focal length at a wide angle end of an overall system of the zoom lens.

Further, when $r_a$ represents a radius of curvature of a surface of the (3-a)th lens sub-group provided closest to the image side, $r_b$ represents a radius of curvature of a surface of the (3-b)th lens sub-group provided closest to the object side, S represents a distance between the (3-a)th lens sub-group and the (3-b)th lens sub-group, and L represents a diagonal length of an image plane, the following condition is satisfied:

$$0.05 < S/\{L^2(1/r_a - 1/r_b)\} < 0.2 \tag{15}$$

Alternatively, the third lens group is held by making a refraction surface located closest to the object side of a lens of the (3-b)th lens sub-group provided closest to the object side to be in contact with a lens member of the (3-a)th lens sub-group provided closest to the image side.

Alternatively, a zoom lens which has at least 3 lens groups of, in the order from an object side, the first lens group having a positive focal length; the second lens group having a negative focal length; and the third lens group having a positive focal length, and which conducts variable magnification by moving the second lens group and the third lens group, wherein the second lens group has a negative (2-1)th lens, whose concave surface faces an image side, a negative (2-2)th lens, whose concave surface faces an object side, and a positive (2-3)th lens, wherein the (2-2)th lens and the (2-3)th lens are made of plastic, and wherein the (2-2)th lens and the (2-3)th lens are cemented together.

More desirably, when $f_w$ represents a focal length at a wide angle end of an overall system of the zoom lens, and $f_2$ represents a focal length of the second lens group, the following condition is satisfied:

$$-0.9 < f_W/f_2 < -0.4 \tag{12}$$

More desirably, when both of the concave surface facing the object side of the (2-2)th lens and a surface facing the image side of the (2-3)th lens are aspherical surfaces each in which, as a point on the aspherical surface is moved away from an optical axis of the lens toward a periphery thereof, a refracting power thereof increases, and $v_{22}$ represents an Abbe's number of the (2-2)th lens and $v_{23}$ represents an Abbe's number of the (2-3)th lens, the following conditions are satisfied:

$$v_{22} > 50 \tag{16}$$

$$v_{23} < 35. \tag{17}$$

More desirably, when $f_W$ represents a focal length of an overall system of the zoom lens, and $f_{2R}$ represents a composite focal length of the (2-2)th and (2-3)th lenses, the following condition is satisfied:

$$|f_W/f_{2R}| < 0.06 \tag{18}$$

Alternatively, a zoom lens which has at least 3 lens groups of, in the order from an object side, the first lens group having a positive focal length; the second lens group having a negative focal length; and the third lens group having a positive focal length, and which conducts variable magnification by moving the second lens group and the third lens group, wherein the second lens group has a negative (2-1)th lens, whose concave surface faces an image side, a negative (2-2)th lens, whose concave surface faces an object side, and a positive (2-3)th lens, wherein the third lens group includes the (3-a)th lens sub-group in which a positive lens and a negative lens are cemented together, and the (3-b)th lens sub-group which is adjacent to the (3-a)th lens sub-group on the image side and includes at least one positive lens, wherein the (2-2)th lens, the(2-3)th lens, and 2 lenses included in the (3-a)th lens sub-group are made of plastic, and at least one of positive lenses, included in the first lens group, the(2-1)th lens and the (3-b)th lens sub-group, is made of glass, and wherein at least one surface of the (3-a)th lens sub-group, and at least one surface of the (2-2)th lens and the (2-3)th lens, are aspherical surfaces.

More desirably, when $f_W$ represents a focal length of an overall system of the zoom lens, $f_{2R}$ represents a composite focal length of the (2-2)th and (2-3)th lenses, and $f_{3-a}$ represents a composite focal length of the (3-a)th lens sub-group, the following conditions are satisfied:

$$|f_W/f_{3-a}| < 0.06 \tag{14}$$

$$|f_W/f_{2R}| < 0.06 \tag{18}$$

More preferably, when $\beta_{2T}$ represents a lateral magnification of the second lens group at a telephoto end, $\beta_{2W}$ represents a lateral magnification of the second lens group at a wide angle end, $\beta_{3T}$ represents a lateral magnification of the third lens group at the telephoto end, and $\beta_{3W}$ represents a lateral magnification of the third lens group at the wide angle end, the following conditions are satisfied:

$$-6.9 < \beta_{3T} < -0.38 \tag{9}$$

$$1.0 < (\beta_{2T}/\beta_{2W}) \cdot (\beta_{2T}/\beta_{3T}) < 4.0 \tag{10}$$

In the above structure, the condition (1) determines a ratio of contribution of the second lens group and the third lens group to the variable magnification, and when the upper limit is exceeded, contribution of the second lens group to the variable magnification becomes too large, and a movement amount of the second lens group at the time of variable magnification becomes large, so that an overall length of the lens becomes long. When a negative refracting power of the second lens group is increased so that the movement amount of the second lens group is reduced, coma generated in the second lens group is increased, or it is necessary to increase the number of component lenses of the second lens group, resulting in an increase of cost.

In the case of a wide angle where a half field angle at a wide angle end satisfies the condition (3), when the condition (2) is satisfied, a compact zoom lens having good performance can be obtained. When the upper limit of the condition (2) is exceeded, a diameter of the first lens group is increased, and is not preferable, and when the condition (2) is below its lower limit, the contribution of the third lens group to variable magnification is too large, therefore, the movement amount of the third lens group at the variable magnification is increased, and as the result, the overall length of the zoom lens is increased, or variation of distortion becomes large at the variable magnification of the third lens group, which is not desirable.

Further, in the case where a focal length at the telephoto end is so long that the condition (5) is satisfied, when the condition (4) is satisfied, a compact zoom lens whose overall length is short, can be obtained. When the condition (4) is over its upper limit, contribution of variable magnification is biased to the second lens group, therefore, the movement amount of the second lens group is too large, as the result, the overall length of the zoom lens is increased, or an amount of aberration generated in the second lens group is increased, and a change of aberration due to the variable magnification becomes large, which is not desirable. When the condition (4) is lower than its lower limit, the movement amount for the variable magnification of the third lens group is increased, thereby, the overall length of the zoom lens is increased.

Further, in the case where a half field angle at the wide angle end and the telephoto end is not extremely biased to a wide angle side or telephoto side as described above, when the conditions (6), (7) and (8) are satisfied, a compact zoom lens in which the overall length and the diameter of the first lens group are well balanced, and aberrations are also satisfactorily corrected, can be obtained. When the condition (6) is over its upper limit, contribution of variable magnification is biased to the second lens group, therefore, the movement amount of the second lens group becomes too large, thereby, the overall length is increased, or an amount of aberration generated in the second lens group is increased and a change of aberration due to the variable magnification is increased, which is not desirable. When the condition (5) is lower than its lower limit, the movement amount of the third lens group for the variable magnification is increased, thereby, the overall length is increased. When the condition (6) is over its upper limit, the overall length of the lens is increased, and the lens diameter of the first lens group is also increased, which is not desirable. When the condition (7) is lower than its lower limit, the movement amount of the third lens group at the time of variable magnification is increased, the overall length is increased, or variation of distortion is increased, which is not desirable. Further, when the condition (7) is satisfied, focusing can be carried out by the third lens group, and the movement amount of the third lens group near the telephoto end at focusing is not so much increased, and photographing of an object at a close range can also be easily carried out. When the condition (8) is over its upper limit, a negative distortion at the wide angle end is increased, and when the condition (8) is lower than its lower limit, the overall length of the lens is increased, which is not desirable.

Further, when the condition (9) is over its upper limit, the overall length of the lens is increased, and the lens diameter of the first lens group is also increased, which is not desirable. When the condition (9) is lower than its lower limit, the movement amount of the third lens group at the variable magnification is increased, variation of distortion is increased, and a positive distortion at the telephoto end and a negative distortion at the wide angle end are increased, which is not desirable. Further, when focusing is carried out by the third lens group, the movement amount for focusing of the third lens group at the telephoto end is increased, thereby, sufficient magnification cannot be obtained, which is not desirable.

The condition (10) determines a ratio of contribution of the second lens group and the third lens group to the variable magnification, and when the condition (10) is over its upper limit, the contribution of the second lens group to the variable magnification is too large, therefore, the movement amount of the second lens group at variable magnification is increased, and the overall length of the lens is also increased, or in order to decrease the movement amount, it is necessary to increase the negative refracting power of the second lens group, and thereby, coma generated in the second lens group is increased, or it is necessary to increase the number of component lenses of the second lens group, resulting in an increase of cost.

Reversely, when the condition (10) is below its lower limit, contribution of the third lens group to the variable magnification is too large, therefore, variation of distortion becomes large, or when the positive refracting power of the third lens group is increased in order to decrease the movement amount of the third lens group and conduct variable magnification, spherical aberration is increased, which is not desirable.

As described above, when conditions (9) and (10) are satisfied, contributions of the second and third lens groups to the variable magnification can be appropriately distributed, thereby, a compact zoom lens in which aberrations are finely corrected by the smaller number of component lenses, can be obtained.

Further, conditions (11), (12) and (13) determine distribution of refracting power of each lens group, and when the condition (11) is over its upper limit, the negative distortion at the wide angle end is increased, and reversely, when the condition (11) is lower than its lower limit, the overall length of the lens is increased, which is not desirable.

When the condition (12) is over its upper limit, the movement of the second lens group at variable magnification is increased, therefore, the overall length of the lens is apt to increase, which is not desirable. When the condition (12) is below its lower limit, variations of various aberrations such as distortion, coma, or curvature of field, due to variable magnification, become large, and it is difficult to finely correct these aberrations in the entire variable magnification range.

When the condition (13) is over its upper limit, the negative distortion at the wide angle end becomes large, and when the condition (13) is below its lower limit, the positive distortion at the telephoto end becomes large, or the movement amount of the third lens group at the variable magnification becomes large, which is not desirable.

Further, when the conditions (9'), (10'), (11'), (12') and (13') are satisfied, a better zoom lens in the above-described points can be obtained.

Further, in the zoom lens having 3 lens groups of positive, negative, and positive lens groups, when the third lens group is structured such that it includes the (3-a) lens group in which a positive lens and a negative lens are cemented together, and the (3-b) lens group having positive refracting power, which includes at least one positive lens adjacent to the (3-a) lens group on the image side, because the positive lens and the negative lens on the image side are cemented together, a zoom lens which scarcely receives an influence of eccentricity at the assembly, and is easily assembled, can be obtained.

Further, when at least one of lens surfaces in the (3-a) lens group is aspherical, the spherical aberration and chromatic aberration can be sufficiently corrected although the number of component lenses is small, and a change of aberration at the variable magnification can be decreased.

On the other hand, when the number of component lenses is decreased, there is a problem in which a radius of curvature of each surface constituting lenses is decreased, and aberration deterioration due to the eccentricity of lenses, specifically a partial-blur, or the like, is easily generated. However, in the composition in which the third lens group includes the (3-a) lens group in which a positive lens and a negative lens are cemented together, and the (3-b) lens group having positive refracting power, which includes at least one positive lens adjacent to the (3-a)th lens sub-group on the image side, because at least one surface of the (3-a)th lens sub-group is aspherical, aberration deterioration due to the eccentricity of lenses, and a partial-blur, or the like, can be suppressed, and the lens is easily assembled, and the spherical aberration or chromatic aberration can be sufficiently corrected although the number of component lenses is small, thereby, a 3-group zoom lens, in which a change of aberration at the variable magnification is decreased, can be obtained. Further, it is more desirable that a plurality of surfaces of the(3-a)th lens sub-group are aspherical. Specifically, it is desirable that a surface closest to an image side and a surface closest to an object side of cemented 2 lenses of the (3-a)th lens sub-group are aspherical.

Further, when this zoom lens is used for a digital still camera or a video camera having an image sensor such as a solid-state image sensor, for example, a ghost image, generated by reflection on the surface of the cover glass of the solid-state image sensor and a lens surface close to the solid-state image sensor, tends to be problems, however, when one surface is made to be a cemented surface, the generating ratio of a ghost image can be decreased.

Further, when all lenses of the (3-a)th lens sub-group are made of plastic lenses, aspherical lenses can be obtained at lower cost, therefore, cost can be greatly reduced as compared with the case of glass aspherial lenses.

Further, weight of the third lens group can be reduced, therefore, when focusing is conducted by the third lens group, a load onto a lens driving device for focusing is smaller, a time period necessary for focusing is reduced, or a size of the lens driving device can be reduced, which are advantageous.

Further, when the condition (14) is satisfied, a change of back-focus due to temperature changes, that is, a change of focused condition is not caused, which is desirable.

Further, the condition (15) is a condition relating to a distance between the (3-a)th lens sub-group and the (3-b)th lens sub-group, and when the condition (15) is over its upper limit, the distance between the (3-a)th lens sub-group and the (3b)th lens sub-group is too large; the length of the third lens group is too long in the optical axis; a vignetting amount of the light flux outside the axis in the third lens group is increased, or the outer diameter of the lens of the third lens group is increased; and as described above, cost is increased; a load onto the lens driving device is increased; or an influence due to the inclination of the third lens group with respect to the optical axis is increased, which is not desirable. Reversely, when the condition (15) is below its lower limit, a distance between the (3-a)th lens sub-group and the (3-b)th lens sub-group is small; a height from the optical axis of a cross point of the refraction surface of the (3-a)th lens sub-group closest to the image side and the refraction surface of the (3-b)th lens sub-group closest to the object side, is small; the sufficient effective diameter thereof cannot be secured; and the vignetting amount is increased.

When the condition (15) is satisfied, the third lens group can be structured such that the refraction surfaces of the (3-a)th lens sub-group and the (3-b)th lens sub-group are in contact with each other and lenses are held, without increasing the lens outer diameter, and simultaneously without increasing the vignetting amount.

When the third lens group is thus structured, an error, in which an optical axis of the lens closest to the object side of the (3-b)th lens sub-group shifts with respect to the (3-a)th lens sub-group, hardly occurs, and the eccentricity having a possibility to be generated is considered to be that due to the tilt of the surface closest to the image side of the (3-b)th lens sub-group. The tilt of the image surface due to optical axis shifting of lenses, that is, the influence on the partial-blur is considerably large as compared to that of the tilt of the refraction surface, therefore, it is necessary to severely remove the eccentricity due to the optical axis shifting, thereby, assembling is difficult. In contrast to that, in the structure of the present invention, the eccentricity is due to only the tilt of the refraction surface, therefore, generation of the partial-blur can be easily prevented.

Further, when the second lens group is composed of the negative (2-1)th lens whose concave surface faces the image side, the negative (2-2)th lens whose concave surface faces the object side, and the positive (2-3)th lens, and the (2-2)th lens and the (2-3)th lens are cemented plastic lenses, cost and weight of the zoom lens can be decreased, and a change of back-focus due to a change of temperature can also be reduced. In the zoom lens of the present invention, the influence onto the image due to the eccentricity of the lens in the second lens group is large, and specifically when the plastic lens is used, because the refractive index is low, a radius of curvature of the lens is decreased, and the influence of the eccentricity is the more increased. However, because cemented lenses are used, the eccentricity of the (2-2)th lens and the (2-3)th lens, specifically, optical axis shifting is hardly generated, thereby, the zoom lens in which image deterioration due to the eccentricity such as a partial-blur or the like, is very small, can be obtained.

Although the condition (12) has been previously described, specifically, in the case where the (2-2)th lens and the (2-3)th lens are plastic lenses, when the condition (12) is below its lower limit, a generation amount of the aberration in the second lens group is too large, so that it is hardly corrected.

Further, when conditions (16) and (17) are satisfied, chromatic aberration generated in the second lens group can be finely corrected. When the condition (16) is below its lower limit, and the condition (17) is over its upper limit, longitudinal chromatic aberration is excessively corrected, or lateral chromatic aberration at the wide angle end is increased, which is not desirable.

Further, when a surface facing the image side of the (2-3)th lens is an aspherical surface having the shape in which the refracting power increases as a point on the surface approaches the lens periphery from the optical axis of the lens, the inward coma at the wide angle end can be finely corrected. In this case, although the lateral chromatic aberration at the wide angle end is increased, this lateral chromatic aberration at the wide angle end can also be finely corrected when a surface facing the object side of the (2-2)th lens is an aspherical surface having the shape, in which the refracting power increases as a point on the surface approaches the lens periphery from the optical axis of the lens.

The condition (18) expresses a condition to reduce the influence of the temperature variation, and when the condition (18) is not satisfied, the focal length of the second lens group is changed by the temperature variation, and magnification, or back-focus, that is, an amount of a change of the focus position increases, which is not desirable.

Further, when focusing is conducted by the third lens group, the performance deterioration by focusing is small, and at the wide angle end, a focusing movement amount of the third lens group is small with respect to a distance to the object, therefore, the macro photographing more than $\frac{1}{10}$ times can be conducted.

BRIEF DESCRIPTION OF THE DRAWINGS

FIGS. 2(A)-1 to 2(A)-3 are aberration views at a wide angle end of Example 1,

FIGS. 2(B)-1 to 2(B)-3 are those at an intermediate focal length, and

FIGS. 2(C)-1 to 2(C)-3 are those at a telephoto end.

FIG. 3 is a sectional view of an optical system at the wide angle end of Example 2, and shows a movement track at zooming.

FIGS. 4(A)-1 to 4(A)-3 are aberration views at the wide angle end of Example 2,

FIGS. 4(B)-1 to 4(B)-3 are those at the intermediate focal length, and

FIGS. 4(C)-1 to 4(C)-3 are those at the telephoto end.

FIGS. 7(A)-1 to 7(A)-3 are aberration views at the wide angle end of Example 3,

FIGS. 7(B)-1 to 7(B)-3 are those at the intermediate focal length, and

FIGS. 7(C)-1 to 7(C)-3 are those at the telephoto end.

FIGS. 9(A)-1 to 9(A)-3 are aberration views at the wide angle end of Example 4,

FIGS. 9(B)-1 to 9(B)-3 are those at the intermediate focal length, and

FIGS. 9(C)-1 to 9(C)-3 are those at the telephoto end.

FIGS. 11(A)-1 to 11(A)-3 are aberration views at the wide angle end of Example 5, FIGS. 11(B)-1 to 11(B)-3 are those at the intermediate focal length, and FIGS. 11(C)-1 to 11(C)-3 are those at the telephoto end.

FIGS. 13(A)-1 to 13(A)-3 are aberration views at the wide angle end of Example 6, FIGS. 13(B)-1 to 13(B)-3 are those at the intermediate focal length, and FIGS. 13(C)-1 to 13(C)-3 are those at the telephoto end.

FIGS. 15(A)-1 to 15(A)-3 are aberration views at the wide angle end of Example 7, FIGS. 15(B)-1 to 15(B)-3 are those at the intermediate focal length, and FIGS. 15(C)-1 to 15(C)-3 are those at the telephoto end.

FIGS. 17(A)-1 to 17(A)-3 are aberration views at the wide angle end of Example 8, FIGS. 17(B)-1 to 17(B)-3 are those at the intermediate focal length, and FIGS. 17(C)-1 to 17(C)-3 are those at the telephoto end.

FIGS. 19(A)-1 to 19(A)-3 are aberration views at the wide angle end of Example 9, FIGS. 19(B)-1 to 19(B)-3 are those at the intermediate focal length, and FIGS. 19(C)-1 to 19(C)-3 are those at the telephoto end.

FIGS. 21(A)-1 to 21(A)-3 are aberration views at the wide angle end of Example 10, FIGS. 21(B)-1 to 21(B)-3 are those at the intermediate focal length, and FIGS. 21(C)-1 to 21(C)-3 are those at the telephoto end.

FIGS. 22(A)-1 to 22(A)-3 are aberration views at the wide angle end of Example 11, FIGS. 22(B)-1 to 22(B)-3 are those at the intermediate focal length, and FIGS. 22(C)-1 to 22(C)-3 are those at the telephoto end.

FIGS. 23(A)-1 to 23(A)-3 are aberration views at the wide angle end of Example 12, FIGS. 23(B)-1 to 23(B)-3 are those at the intermediate focal length, and FIGS. 23(C)-1 to 23(C)-3 are those at the telephoto end.

FIGS. 25(A)-1 to 25(A)-3 are aberration views at the wide angle end of Example 13, FIGS. 25(B)-1 to 25(B)-3 are those at the intermediate focal length, and FIGS. 25(C)-1 to 25(C)-3 are those at the telephoto end.

DETAILED DESCRIPTION OF THE PREFERRED EMBODIMENT

Figure 1:
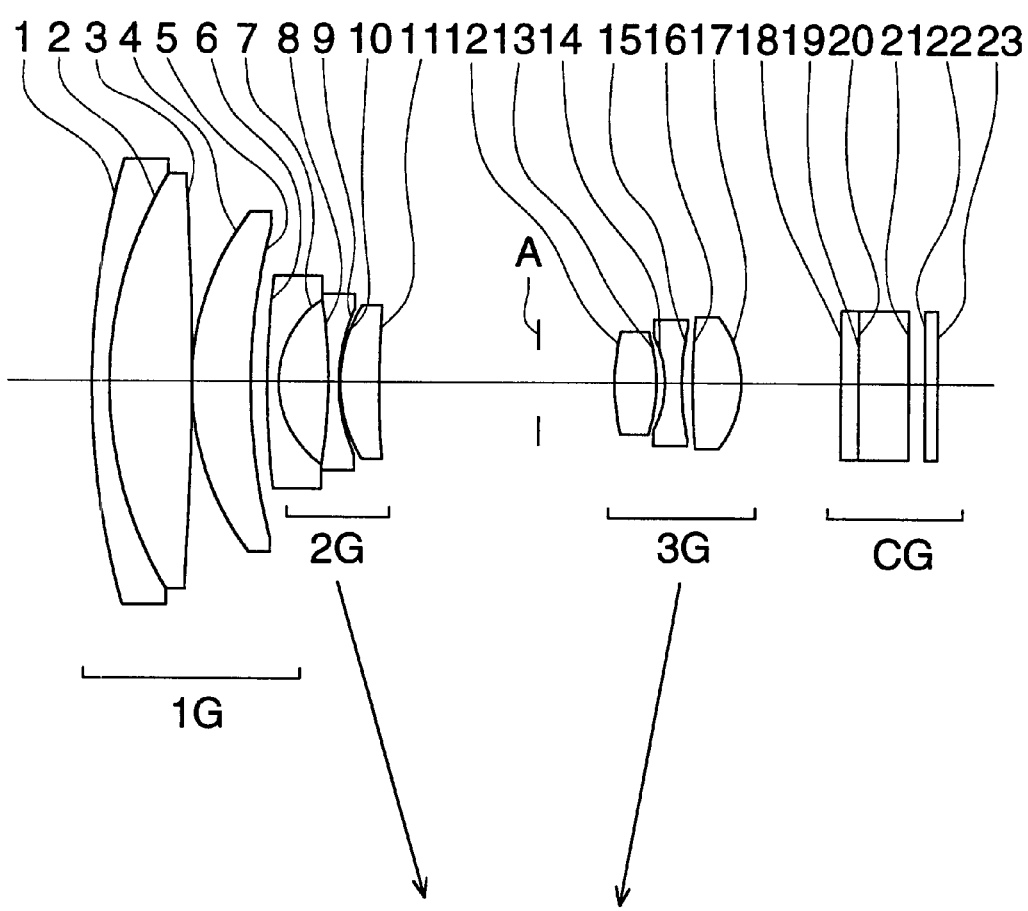
FIG. 1 is a sectional view of an optical system at a wide angle end of Example 1, and shows a movement track at zooming.
Figure 2:
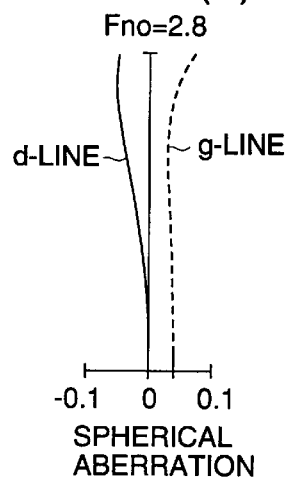
Figure 2:
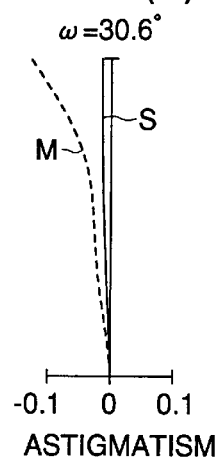
Figure 2:
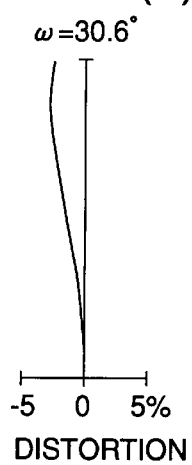
Figure 2:
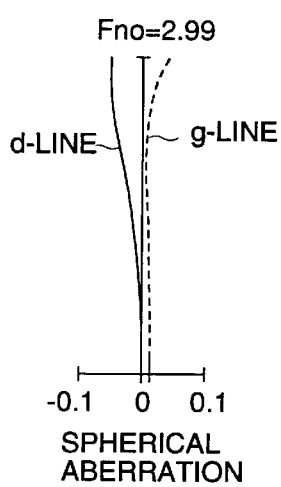
Figure 2:
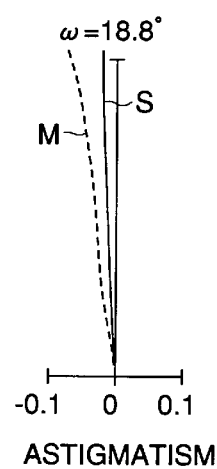
Figure 2:
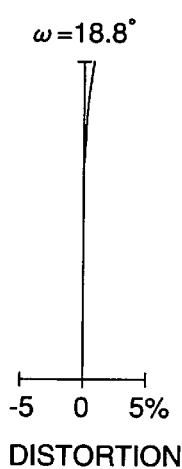
Figure 2:
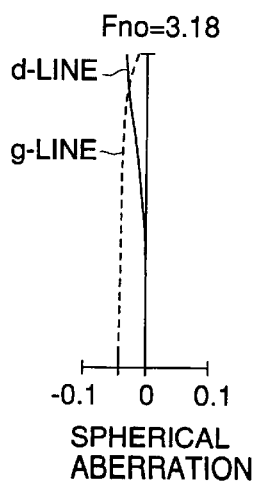
Figure 2:
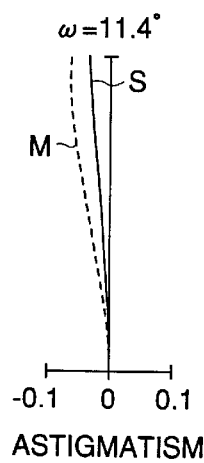
Figure 2:
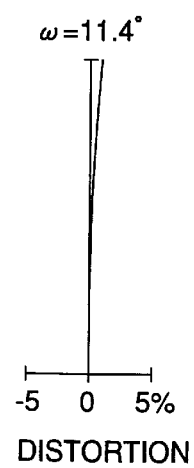

Examples of a zoom lens of the present invention will be shown below. Symbols used in each Example are as follows. A zoom lens in each Example can be applied to that of a digital still camera and also that of a video camera. Specifically, it is preferably used in a digital still camera and a video camera in which the length of a zoom lens barrel thereof is fixed. Further, as the preferable structure of a digital still camera, a structure in which an aperture, a mechanical shutter, or the like, is located between the second lens group and the third lens group, and it is not moved both at variable magnification and at focusing, or only at focusing, is considered.

f: A focal length of an overall system
$F_{no}$: F-number
ω: A half field angle
$ω_W$: A half field angle at the wide angle end
$ω_T$: A half field angle at the telephoto end
R: A radius of curvature of the refraction surface
D: A distance between the refraction surfaces
N: A refractive index of lens material at d line (588 nm)
ν: An Abbe's number
$f_W$: A focal length of the overall system at the wide angle end
$f_1$: A focal length of the first lens group
$f_2$: A focal length of the second lens group
$f_3$: A focal length of the third lens group
$f_{3-a}$: A focal length of the (3-a)th lens sub-group
$f_{2R}$: A composite focal length of the (2-2)th lens and the (2-3)th lens
$β_{2W}$: A lateral magnification of the second lens group at the wide angle end $\beta_{3W}$: A lateral magnification of the third lens group at the wide angle end $\beta_{2T}$: A lateral magnification of the second lens group at the telephoto end $\beta_{3T}$: A lateral magnification of the third lens group at the telephoto end S: A distance between the (3-a)th lens sub-group and the (3-b)th lens sub-group L: A diagonal length of an image plane $r_a$: A radius of curvature of a surface of the (3-a)th lens sub-group provided closest to the image side $r_b$: A radius of curvature of a surface of the (3-b)th lens sub-group provided closest to the object side 1G: The first lens group 2G: The second lens group 3G: The third lens group A: Aperture Further, when, as coordinates, the X-axis is determined in the direction of the optical axis, and the height in the direction perpendicular to the optical axis is expressed by h, the shape of the aspherical surface is expressed by [Equation 1].

$$X = \frac{h^2/R}{1 + \sqrt{1-(K+1)h^2/R^2}} + A_4 \cdot h^4 + A_6 \cdot h^6 + A_8 \cdot h^8 + A_{10} \cdot h^{10} \quad \text{[Equation 1]}$$

In [Equation 1], K represents a conical coefficient, and $A_4$, $A_6$, $A_8$, $A_{10}$ represent aspherical coefficients.

A cover glass CG in each of optical sectional views represents a low-pass filter, an infrared blocking filter, a cover glass of a CCD, etc.

(EXAMPLES 1 and 2)

In Example 1, the third lens group is composed of, in the order from the object side, a positive lens, a negative lens, and a positive lens whose one surface is aspherical, and in Example 2, the third lens group is composed of, in the order from the object side, a positive lens, a negative lens, and 2 positive lenses, and all lenses are spherical.

A sectional view of an optical system at the wide angle end of Example 1 is shown in FIG. 1, and lens data of Example 1 is shown in Tables 1 and 2. Views of lens aberrations are shown in FIGS. 2(A)-1 to 2(C)-3. Incidentally, each arrow in FIG. 1 shows a movement track of lens groups when the lens groups are moved in the direction of optical axis during zooming from the wide angle side to the telephoto side.

TABLE 1 f = 6.19-10.40-17.50, $F_{no}$ = 2.80 −2.99 −3.18
ω = 30.6° - 18.8° - 11.4°

| Surface No. | R | D | N | ν |
|---|---|---|---|---|
| 1 | 47.414 | 1.00 | 1.80518 | 25.4 |
| 2 | 24.019 | 4.80 | 1.62299 | 58.2 |
| 3 | −210.505 | 0.20 | | |
| 4 | 16.803 | 3.40 | 1.62299 | 58.2 |
| 5 | 37.433 | 1.00-5.50-9.34 | | |
| 6 | 59.536 | 0.60 | 1.77250 | 49.6 |
| 7 | 5.610 | 3.00 | | |
| 8 | −40.535 | 0.60 | 1.77250 | 49.6 |
| 9 | 10.079 | 0.20 | | |
| 10 | 8.820 | 2.30 | 1.84666 | 23.8 |
| 11 | 102.336 | 13.94-8.39-3.70 | | |
| 12 | 12.144 | 2.50 | 1.80610 | 40.9 |

TABLE 1-continued f = 6.19-10.40-17.50, $F_{no}$ = 2.80 −2.99 −3.18
ω = 30.6° - 18.8° - 11.4°

| Surface No. | R | D | N | ν |
|---|---|---|---|---|
| 13 | −9.287 | 0.47 | | |
| 14 | −6.213 | 1.00 | 1.80518 | 25.4 |
| 15 | 16.602 | 0.71 | | |
| 16 | 42.460 | 2.80 | 1.69350 | 53.2 |
| 17 | −6.476 | 5.95-7.01-7.85 | | |
| 18 | ∞ | 1.00 | 1.52000 | 65.0 |
| 19 | ∞ | 0.00 | | |
| 20 | ∞ | 1.89 | 1.54880 | 67.0 |
| 21 | ∞ | 0.20 | | |
| 22 | ∞ | 0.75 | 1.51633 | 64.1 |
| 23 | ∞ | | | |

TABLE 2

| Surface | Aspherical surface coefficients |
|---|---|
| The 16$^{th}$ surface | K = −116.620 |
| | $A_4$ = −2.78970 × 10$^{-4}$ |
| | $A_6$ = 2.08480 × 10$^{-6}$ |
| | $A_8$ = 1.74820 × 10$^{-8}$ |
| | $A_{10}$ = 1.09540 × 10$^{-8}$ |
| $\beta_{3T}$ = −0.63 | $f_W/f_1$ = 0.21 |
| $(\beta_{2T}/\beta_{2W}) \cdot (\beta_{3W}/\beta_{3T})$ = 1.45 | $f_1/f_3$ = 2.83 |
| $f_W/f_2$ = −0.81 | $L_t/(L \sqrt{Z})$ = 4.5 |

Figure 3:
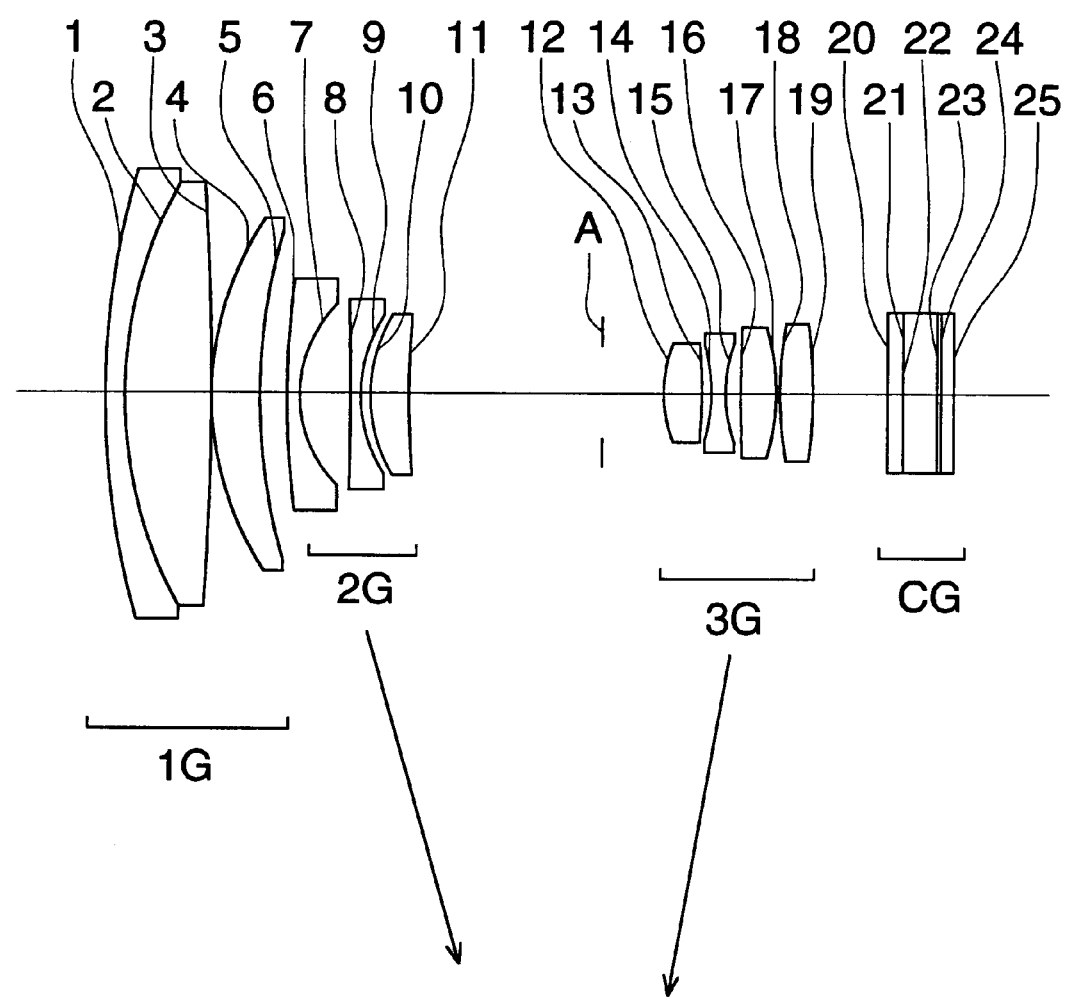
Figure 4:
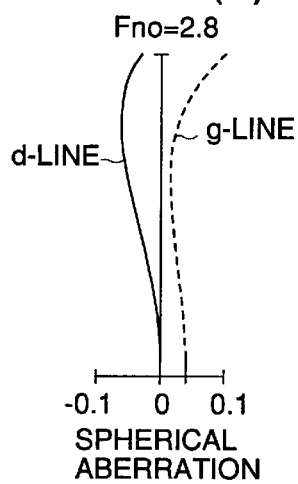
Figure 4:
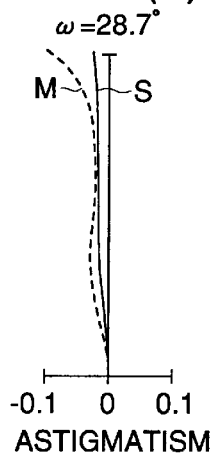
Figure 4:
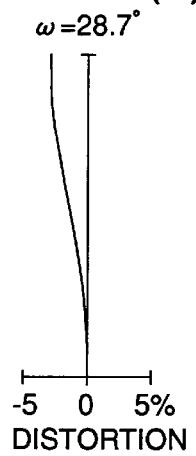
Figure 4:
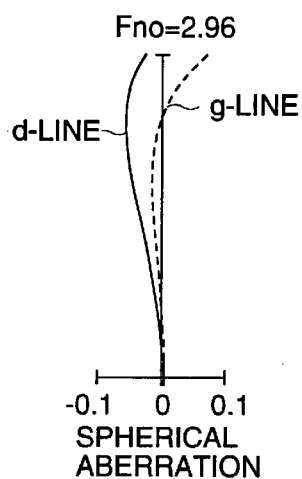
Figure 4:
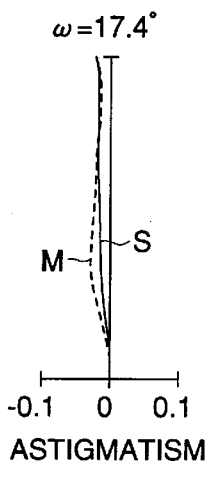
Figure 4:
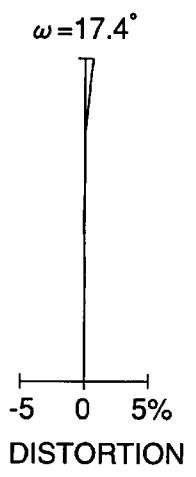
Figure 4:
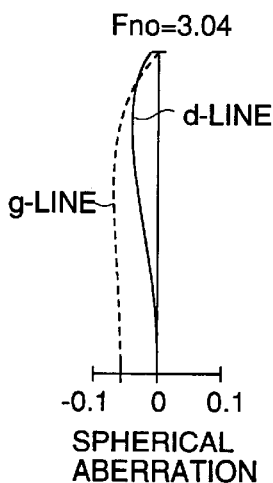
Figure 4:
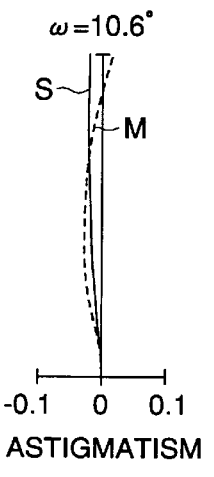
Figure 4:
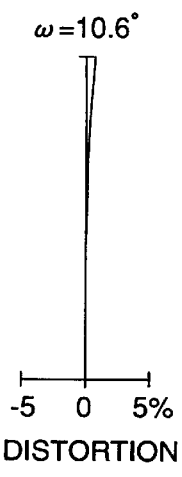

A sectional view of an optical system at the wide angle end of Example 2 is shown in FIG. 3, and lens data of Example 2 is shown in Tables 3 and 4. Views of lens aberrations are shown In FIGS. 4(A)-1 to 4(C)-3. Incidentally, each arrow in FIG. 3 shows a movement track of lens groups when the lens groups are moved in the direction of optical axis during zooming from the wide angle side to the telephoto side.

TABLE 3 f = 6.70-11.30-18.90, $F_{no}$ = 2.80 −2.96 −3.04
ω = 28.7° - 17.4° - 10.6°

| Surface No. | R | D | N | ν |
|---|---|---|---|---|
| 1 | 47.929 | 1.00 | 1.80518 | 25.4 |
| 2 | 24.485 | 4.80 | 1.62299 | 58.2 |
| 3 | −167.219 | 0.20 | | |
| 4 | 18.516 | 2.70 | 1.62299 | 58.2 |
| 5 | 37.352 | 1.60-6.82-11.40 | | |
| 6 | 86.556 | 0.60 | 1.77250 | 49.6 |
| 7 | 7.250 | 2.90 | | |
| 8 | −87.710 | 0.60 | 1.77250 | 49.6 |
| 9 | 8.429 | 0.50 | | |
| 10 | 8.874 | 2.20 | 1.84666 | 23.8 |
| 11 | 70.329 | 14.42-8.34-3.39 | | |
| 12 | 6.933 | 2.20 | 1.74400 | 44.8 |
| 13 | −29.150 | 0.50 | | |
| 14 | −10.960 | 0.80 | 1.80518 | 25.4 |
| 15 | 8.084 | 0.90 | | |
| 16 | 165.105 | 2.00 | 1.72916 | 54.7 |
| 17 | −11.338 | 0.20 | | |
| 18 | 22.880 | 1.90 | 1.72916 | 54.7 |
| 19 | −22.880 | 4.14-5.00-5.37 | | |
| 20 | ∞ | 1.00 | 1.52000 | 65.0 |
| 21 | ∞ | 0.00 | | |
| 22 | ∞ | 1.89 | 1.54880 | 67.0 |
| 23 | ∞ | 0.20 | | |
| 24 | ∞ | 0.75 | 1.51633 | 64.1 |
| 25 | ∞ | | | |

TABLE 4

| | |
|---|---|
| $\beta_{3T} = -0.53$ | $f_W/f_2 = -0.75$ |
| $(\beta_{2T}/\beta_{2W}) \cdot (\beta_{3W}/\beta_{3T}) = 1.72$ | $f_1/f_3 = 3.07$ |
| $f_W/f_1 = 0.20$ | $Lt/(L \sqrt{Z}) = 4.4$ |

EXAMPLES 3, 4, 5, 6

Figure 6:
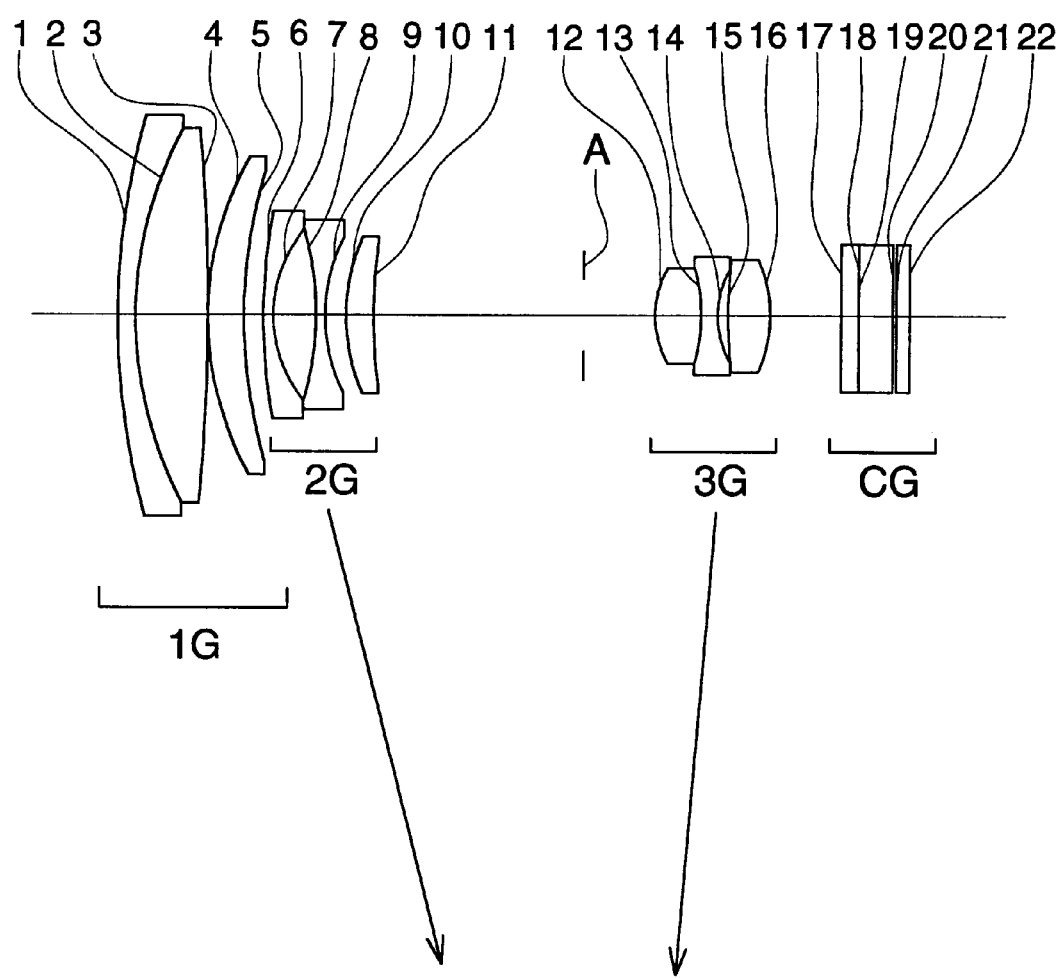
FIG. 6 is a sectional view of an optical system at the wide angle end of Example 3, and shows a movement track at zooming.
Figure 7:
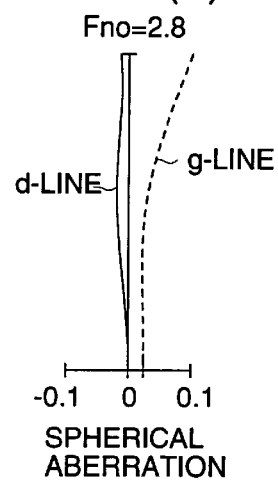
Figure 7:
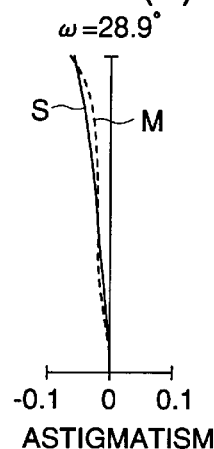
Figure 7:
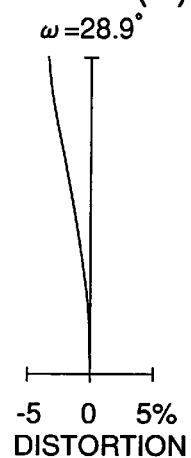
Figure 7:
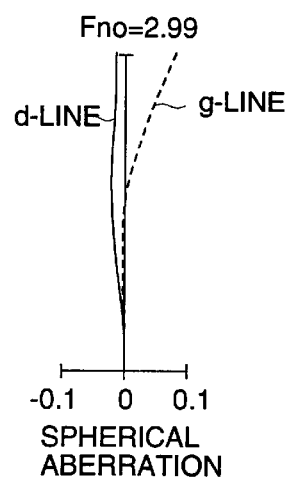
Figure 7:
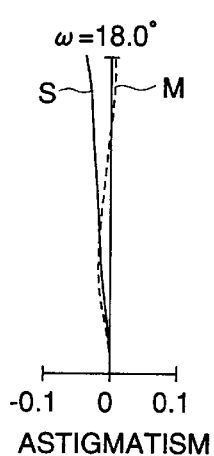
Figure 7:
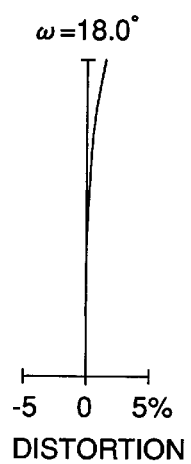
Figure 7:
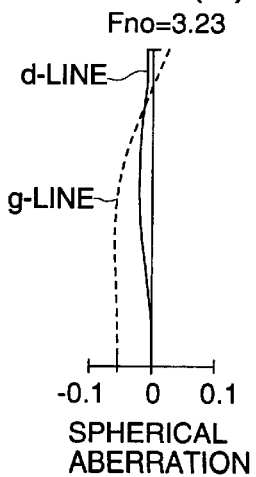
Figure 7:
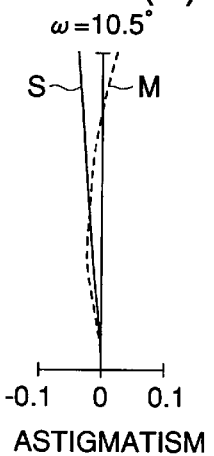
Figure 7:
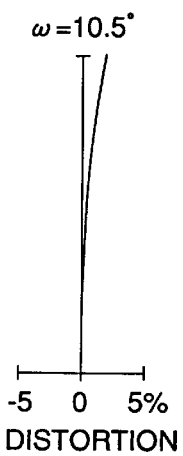

A sectional view of an optical system at the wide angle end of Example 3 is shown in FIG. 6, and lens data of Example 3 is shown in Tables 5 and 6. Views of lens aberrations are shown in FIGS. 7(A)-1 to 7(C)-3. Incidentally, each arrow in FIG. 6 shows a movement track of lens groups when the lens groups are moved in the direction of optical axis during zooming from the wide angle side to the telephoto side.

TABLE 5 f = 6.70-10.86-18.92, $F_{no}$ = 2.80 -2.99 -3.23
ω = 28.9° - 18.0° - 10.5°

| Surface No. | R | D | N | ν |
|---|---|---|---|---|
| 1 | 44.574 | 1.00 | 1.80518 | 25.4 |
| 2 | 24.726 | 4.10 | 1.62299 | 57.0 |
| 3 | −149.899 | 0.20 | | |
| 4 | 20.199 | 2.00 | 1.62280 | 57.0 |
| 5 | 31.034 | 1.20-6.79-12.20 | | |
| 6 | 35.848 | 0.60 | 1.72000 | 50.2 |
| 7 | 8.540 | 2.50 | | |
| 8 | −20.258 | 0.60 | 1.71300 | 53.9 |
| 9 | 10.803 | 1.30 | | |
| 10 | 13.546 | 1.70 | 1.84666 | 23.8 |
| 11 | 233.122 | 16.57-10.02-3.60 | | |
| 12 | 5.853 | 2.70 | 1.49700 | 56.0 |
| 13 | −11.857 | 1.00 | 1.58300 | 30.0 |
| 14 | −6.386 | 0.60 | | |
| 15 | 19.453 | 2.40 | 1.72916 | 54.7 |
| 16 | −9.834 | 4.44-5.40-6.41 | | |
| 17 | ∞ | 1.00 | 1.52000 | 65.0 |
| 18 | ∞ | 0.00 | | |
| 19 | ∞ | 1.89 | 1.54880 | 67.0 |
| 20 | ∞ | 0.20 | | |
| 21 | ∞ | 0.75 | 1.51633 | 64.1 |
| 22 | ∞ | | | |

TABLE 6

| Surface | Aspherical surface coefficients |
|---|---|
| The 12th surface | K = −9.00697 × 10⁻¹<br>$A_4$ = −2.25946 × 10⁻⁴<br>$A_6$ = −1.85421 × 10⁻⁵<br>$A_8$ = 1.07119 × 10⁻⁶<br>$A_{10}$ = −4.91467 × 10⁻⁸ |
| The 14th surface | K = −4.74974 × 10⁻²<br>$A_4$ = 2.19268 × 10⁻⁵<br>$A_6$ = −1.89055 × 10⁻⁵<br>$A_8$ = −5.99568 × 10⁻⁷ |

| | |
|---|---|
| $\beta_{3T} = -0.57$ | $f_1/f_3 = 3.47$ |
| $(\beta_{2T}/\beta_{2W}) \cdot (\beta_{3W}/\beta_{3T}) = 1.34$ | $f_W/f_{3-a} = 0.041$ |
| $f_W/f_1 = -0.18$ | $L = 7.14$ |
| $f_W/f_2 = -0.66$ | $S/\{L^2(1/r_a - 1/r_b)\} = 0.112$ |
| $Lt/(L \sqrt{Z}) = 4.4$ | |

Figure 8:
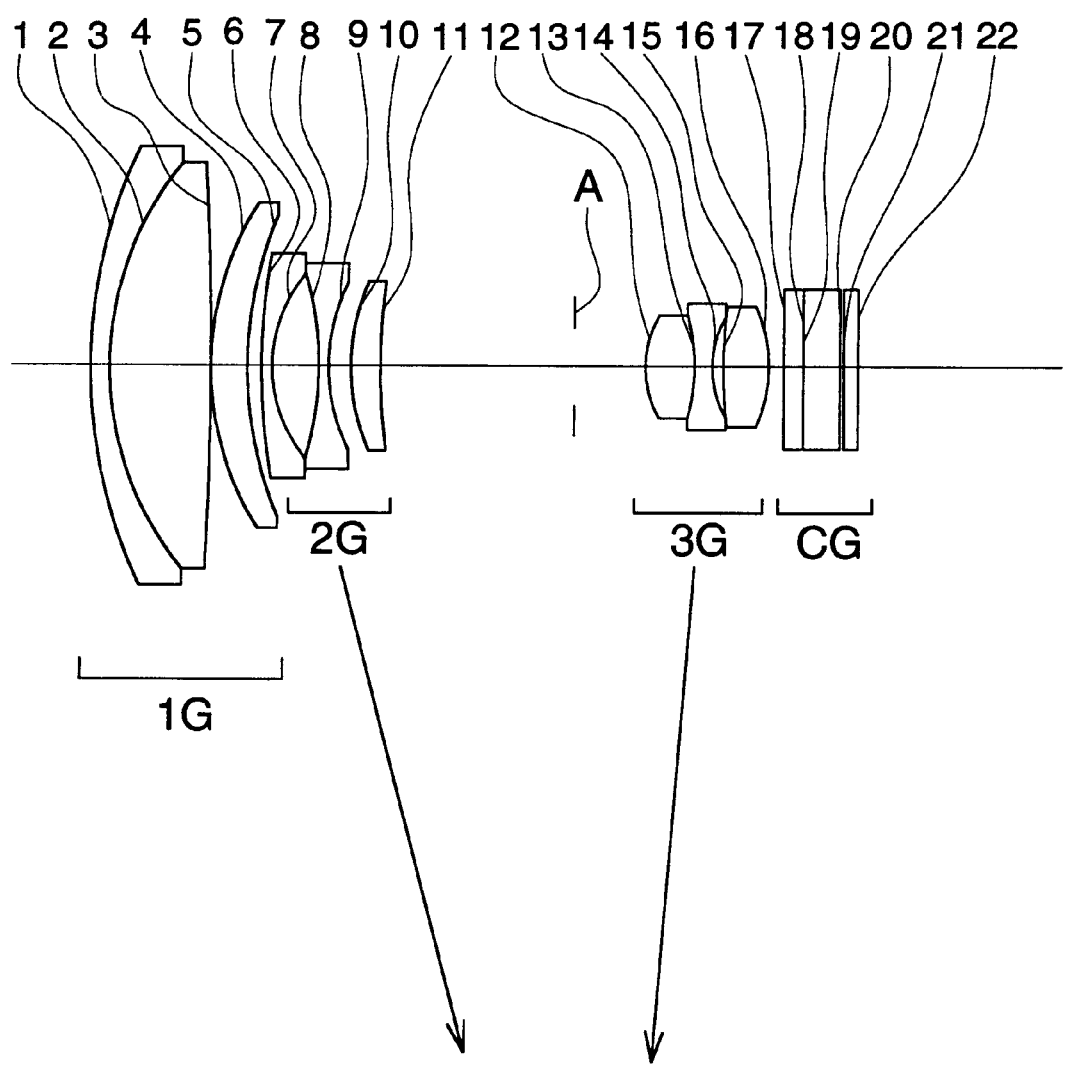
FIG. 8 is a sectional view of an optical system at the wide angle end of Example 4, and shows a movement track at zooming.
Figure 9:
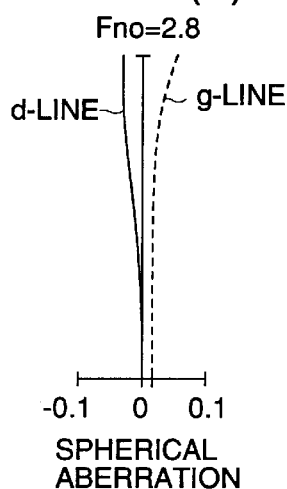
Figure 9:
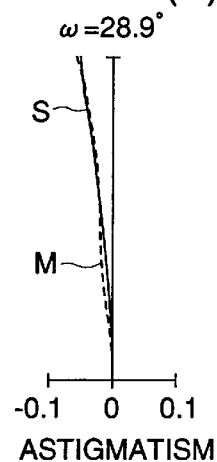
Figure 9:
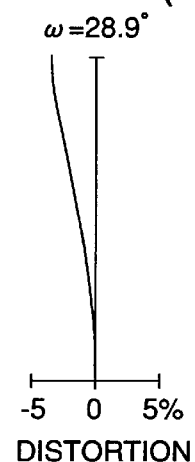
Figure 9:
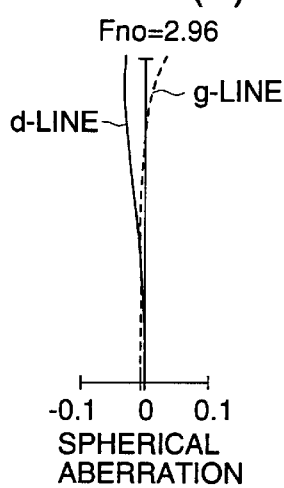
Figure 9:
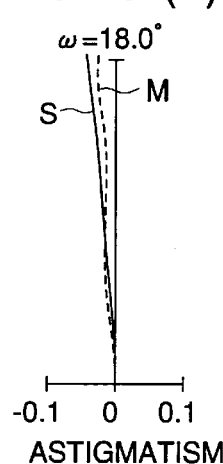
Figure 9:
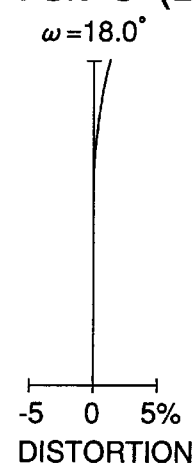
Figure 9:
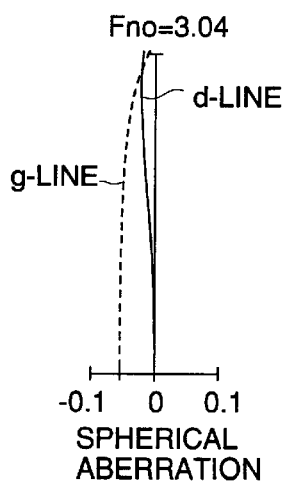
Figure 9:
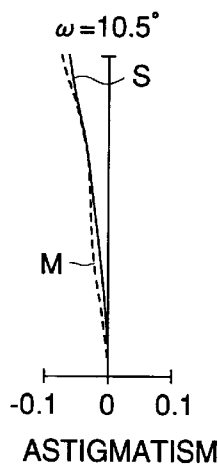
Figure 9:
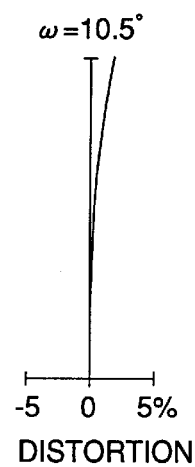

A sectional view of an optical system at the wide angle end of Example 4 is shown in FIG. 8, and lens data of Example 4 is shown in Tables 7 and 8. Views of lens aberrations are shown in FIGS. 9(A)-1 to 9(C)-3. Incidentally, each arrow in FIG. 8 shows a movement track of lens groups when the lens groups are moved in the direction of optical axis during zooming from the wide angle side to the telephoto side.

TABLE 7 f = 6.70 -10.86 -18.92, $F_{no}$ = 2.80 -2.96 -3.04
ω = 28.9° − 18.0° − 10.5°

| Surface No. | R | D | N | ν |
|---|---|---|---|---|
| 1 | 28.292 | 1.00 | 1.80518 | 25.4 |
| 2 | 17.907 | 5.30 | 1.62299 | 58.2 |
| 3 | −253.317 | 0.20 | | |
| 4 | 16.748 | 2.00 | 1.62299 | 58.2 |
| 5 | 22.164 | 0.90 −5.57 −10.40 | | |
| 6 | 31.230 | 0.60 | 1.71300 | 53.9 |
| 7 | 7.521 | 2.60 | | |
| 8 | −16.604 | 0.60 | 1.71300 | 53.9 |
| 9 | 10.153 | 1.10 | | |
| 10 | 12.711 | 1.80 | 1.84666 | 23.8 |
| 11 | 315.683 | 13.88 −8.86 −3.70 | | |
| 12 | 5.936 | 2.70 | 1.49700 | 56.0 |
| 13 | −10.013 | 1.00 | 1.58300 | 30.0 |
| 14 | 6.627 | 0.60 | | |
| 15 | 15.927 | 2.40 | 1.72916 | 54.7 |
| 16 | −9.611 | 1.00 −1.86 −2.08 | | |
| 17 | ∞ | 1.00 | 1.52000 | 65.0 |
| 18 | ∞ | 0.00 | | |
| 19 | ∞ | 1.89 | 1.54880 | 67.0 |
| 20 | ∞ | 0.20 | | |
| 21 | ∞ | 0.75 | 1.51633 | 64.1 |
| 22 | ∞ | | | |

TABLE 8

| Surface | Aspherical surface coefficients |
|---|---|
| The 12th surface | K = −8.94390 × 10⁻¹<br>$A_4$ = −3.91430 × 10⁻⁶<br>$A_6$ = −8.89800 × 10⁻⁶<br>$A_8$ = −2.74580 × 10⁻⁷<br>$A_{10}$ = −5.64730 × 10⁻⁹ |
| The 14th surface | K = 3.66460 × 10⁻¹<br>$A_4$ = 4.47690 × 10⁻⁵<br>$A_6$ = −2.98370 × 10⁻⁵<br>$A_8$ = 1.80290 × 10⁻⁷<br>$A_{10}$ = −5.48350 × 10⁻⁸ |

| | |
|---|---|
| $\beta_{3T} = -0.52$ | $f_1/f_3 = 3.18$ |
| $(\beta_{2T}/\beta_{2W}) \cdot (\beta_{3W}/\beta_{3T}) = 1.77$ | $f_W/f_{3-a} = 0.04$ |
| $f_W/f_1 = -0.14$ | $L = 7.14$ |
| $f_W/f_2 = -0.52$ | $S/\{L^2(1/r_a - 1/r_b)\} = 0.134$ |
| $Lt/(L \sqrt{Z}) = 4.2$ | |

Figure 10:
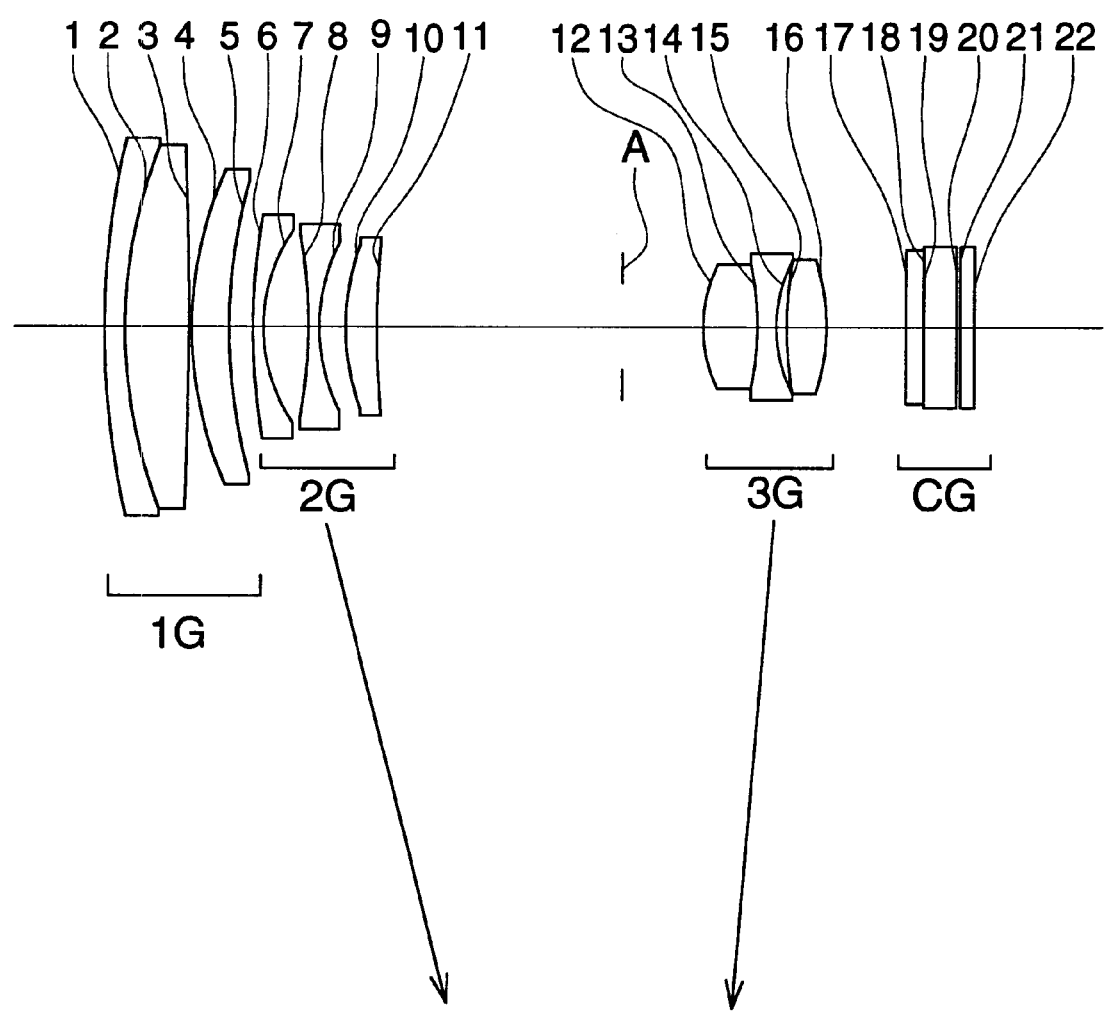
FIG. 10 is a sectional view of an optical system at the wide angle end of Example 5, and shows a movement track at zooming.
Figure 11:
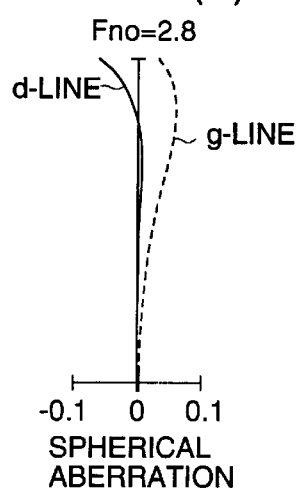
Figure 11:
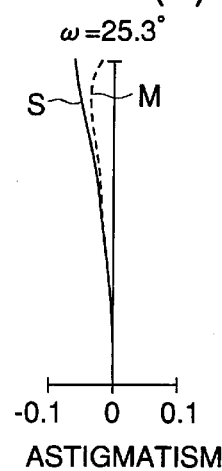
Figure 11:
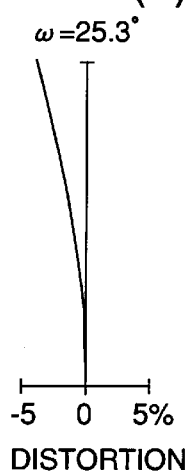
Figure 11:
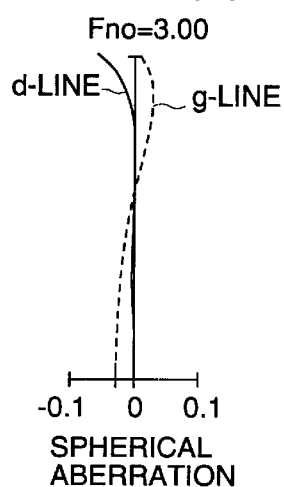
Figure 11:
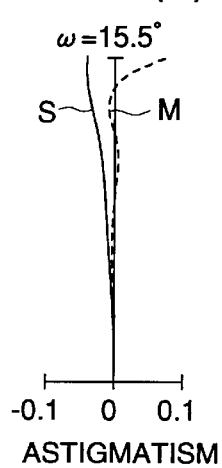
Figure 11:
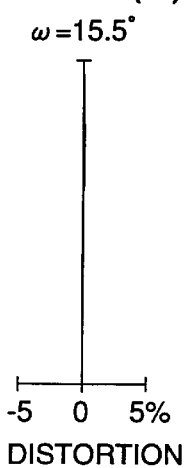
Figure 11:
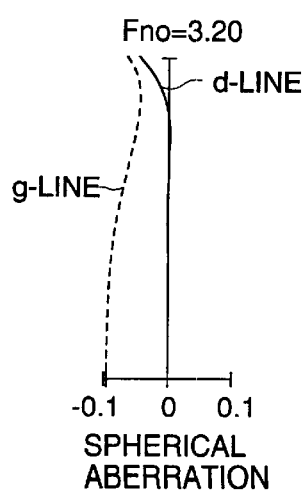
Figure 11:
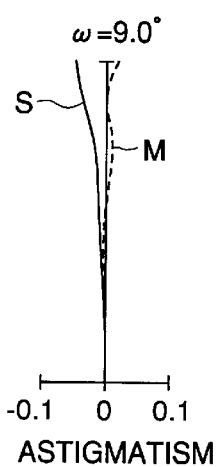
Figure 11:
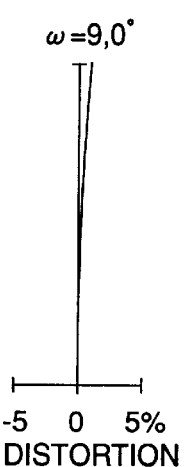

A sectional view of an optical system at the wide angle end of Example 5 is shown in FIG. 10, and lens data of Example 5 is shown in Tables 9 and 10. Views of lens aberrations are shown in FIGS. 11(A)-1 to 11(C)-3. Incidentally, each arrow in FIG. 10 shows a movement track of lens groups when the lens groups are moved in the direction of optical axis during zooming from the wide angle side to the telephoto side.

TABLE 9 f = 7.86 −12.84 −22.37, $F_{no}$ = 2.80 −3.00 −3.20
ω = 25.3° − 15.5° − 9.0°

| Surface No. | R | D | N | ν |
|---|---|---|---|---|
| 1 | 47.682 | 1.10 | 1.80518 | 25.4 |
| 2 | 26.396 | 3.60 | 1.62280 | 57.0 |
| 3 | −187.721 | 0.20 | | |
| 4 | 21.468 | 2.10 | 1.62280 | 57.0 |
| 5 | 33.489 | 1.30 −7.52 −13.66 | | |

TABLE 9-continued f = 7.86 −12.84 −22.37,   $F_{no}$ = 2.80 −3.00 −3.20
ω = 25.3° − 15.5° − 9.0°

| Surface No. | R | D | N | ν |
|---|---|---|---|---|
| 6 | 42.347 | 0.60 | 1.72000 | 50.2 |
| 7 | 9.981 | 2.50 | | |
| 8 | −25.842 | 0.60 | 1.71300 | 53.9 |
| 9 | 11.117 | 1.50 | | |
| 10 | 14.058 | 1.80 | 1.84666 | 23.8 |
| 11 | 111.988 | 18.22 −10.94 −3.90 | | |
| 12 | 6.574 | 3.00 | 1.49700 | 56.0 |
| 13 | −17.228 | 1.10 | 1.58300 | 30.0 |
| 14 | 6.812 | 0.60 | | |
| 15 | 19.642 | 2.20 | 1.72916 | 54.7 |
| 16 | −11.402 | 4.44 −5.50 −6.39 | | |
| 17 | ∞ | 1.00 | 1.52000 | 65.0 |
| 18 | ∞ | 0.00 | | |
| 19 | ∞ | 1.89 | 1.54880 | 67.0 |
| 20 | ∞ | 0.20 | | |
| 21 | ∞ | 0.75 | 1.51633 | 64.1 |
| 22 | ∞ | | | |

TABLE 10

| Surface | Aspherical surface coefficients |
|---|---|
| The 12th surface | K = −1.24520<br>$A_4$ = −1.20430 × 10$^{-6}$<br>$A_6$ = −3.39030 × 10$^{-6}$<br>$A_8$ = −1.20990 × 10$^{-7}$<br>$A_{10}$ = −4.11560 × 10$^{-9}$ |
| The 14th surface | K = −0.61897<br>$A_4$ = 7.31320 × 10$^{-6}$<br>$A_6$ = −3.57420 × 10$^{-6}$<br>$A_8$ = 1.01630 × 10$^{-7}$ |

$β_{3T}$ = −0.56              $f_1/f_3$ = 3.3
$(β_{2T}/β_{2W}) · (β_{3W}/β_{3T})$ = 1.47    $f_W/f_{3-a}$ = 0.024
$f_W/f_1$ = −0.19              L = 7.14
$f_W/f_2$ = −0.68              $S/\{L^2(1/r_a − 1/r_b)\}$ = 0.123
$L_t/(L \sqrt{Z})$ = 4.6

Figure 12:
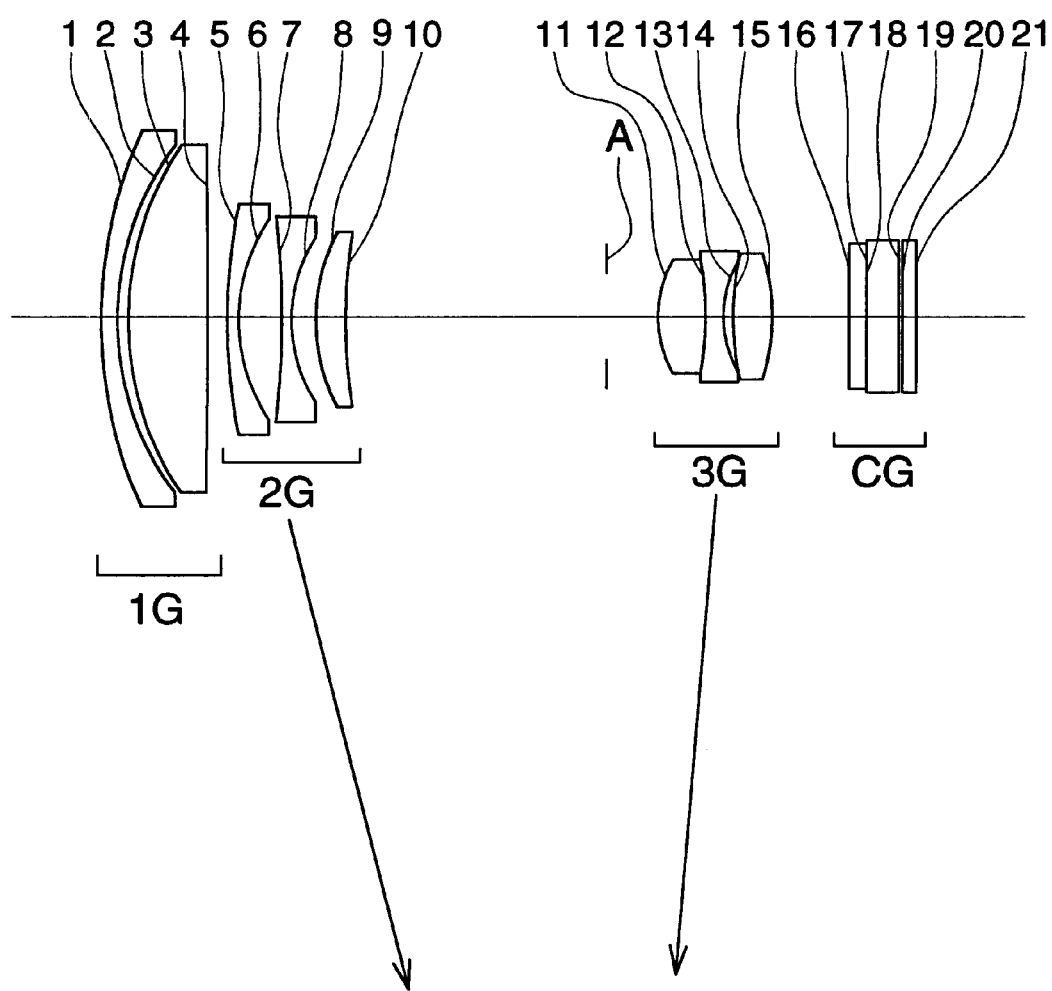
FIG. 12 is a sectional view of an optical system at the wide angle end of Example 6, and shows a movement track at zooming.
Figure 13:
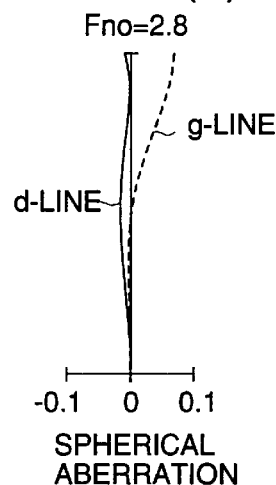
Figure 13:
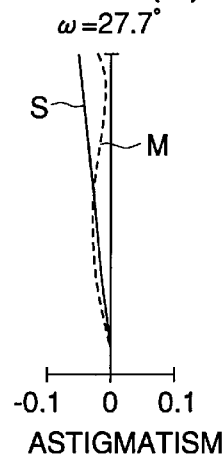
Figure 13:
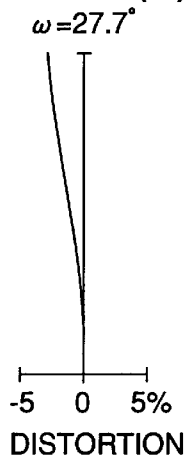
Figure 13:
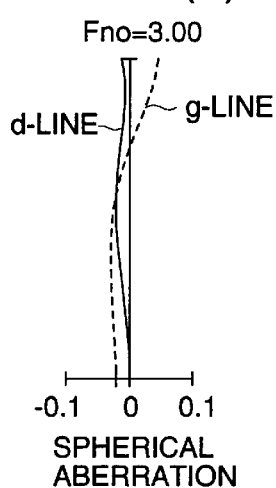
Figure 13:
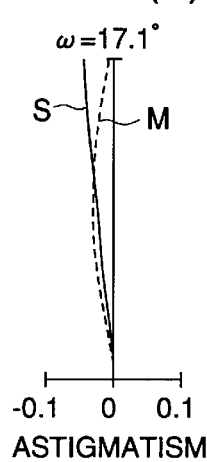
Figure 13:
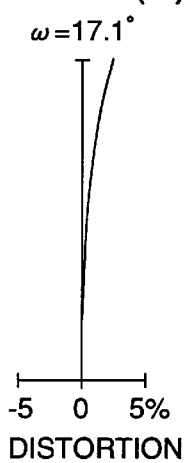
Figure 13:
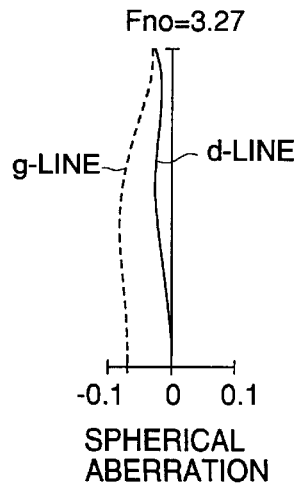
Figure 13:
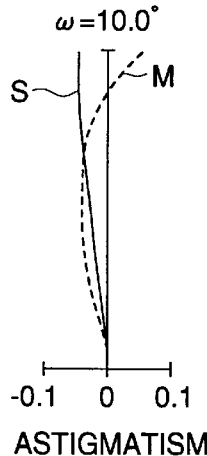
Figure 13:
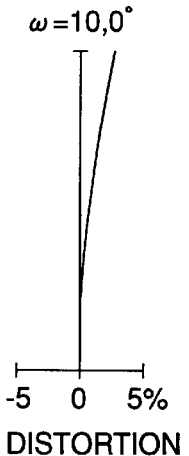

A sectional view of an optical system at the wide angle end of Example 6 is shown in FIG. 12, and lens data of Example 6 is shown in Tables 11 and 12. Views of lens aberrations are shown in FIGS. 13(A)-1 to 13(C)-3. Incidentally, each arrow in FIG. 12 shows a movement track of lens groups when the lens groups are moved in the direction of optical axis during zooming from the wide angle side to the telephoto side.

TABLE 11 f = 7.01 −11.37 −19.69,   $F_{no}$ = 2.80 −3.00 −3.27
ω = 27.7° − 17.1° − 10.0°

| Surface No. | R | D | N | ν |
|---|---|---|---|---|
| 1 | 26.081 | 1.00 | 1.80518 | 25.4 |
| 2 | 16.991 | 0.50 | | |
| 3 | 18.390 | 4.50 | 1.71300 | 53.9 |
| 4 | −395.424 | 1.10 −7.07 −12.71 | | |
| 5 | 37.129 | 0.60 | 1.72000 | 50.2 |
| 6 | 10.412 | 2.40 | | |
| 7 | −41.295 | 0.60 | 1.71300 | 53.9 |
| 8 | 8.695 | 1.40 | | |
| 9 | 10.741 | 1.70 | 1.84666 | 23.8 |
| 10 | 32.309 | 17.86 −10.85 −4.00 | | |
| 11 | 5.650 | 2.70 | 1.49700 | 56.0 |
| 12 | −22.335 | 1.00 | 1.58300 | 30.0 |
| 13 | 5.620 | 0.60 | | |
| 14 | 16.067 | 2.20 | 1.72916 | 54.7 |

TABLE 11-continued f = 7.01 −11.37 −19.69,   $F_{no}$ = 2.80 −3.00 −3.27
ω = 27.7° − 17.1° − 10.0°

| Surface No. | R | D | N | ν |
|---|---|---|---|---|
| 15 | −10.853 | 4.44 −5.49 −6.69 | | |
| 16 | ∞ | 1.00 | 1.52000 | 65.0 |
| 17 | ∞ | 0.00 | | |
| 18 | ∞ | 1.89 | 1.54880 | 67.0 |
| 19 | ∞ | 0.20 | | |
| 20 | ∞ | 0.75 | 1.51633 | 64.1 |
| 21 | ∞ | | | |

TABLE 12

| Surface | Aspherical surface coefficients |
|---|---|
| The 11th surface | K = −0.927066<br>$A_4$ = −2.65702 × 10$^{-6}$<br>$A_6$ = −1.95583 × 10$^{-6}$<br>$A_8$ = −1.20433 × 10$^{-7}$<br>$A_{10}$ = −3.50515 × 10$^{-9}$ |
| The 13th surface | K = −0.464305<br>$A_4$ = 2.09606 × 10$^{-6}$<br>$A_6$ = −1.91268 × 10$^{-6}$<br>$A_8$ = 4.18940 × 10$^{-7}$ |

$β_{3T}$ = −0.59              $f_1/f_3$ = 3.63
$(β_{2T}/β_{2W}) · (β_{3W}/β_{3T})$ = 1.23    $f_W/f_{3-a}$ = 0.021
$f_W/f_1$ = −0.17              L = 7.14
$f_W/f_2$ = −0.64              $S/\{L^2(1/r_a − 1/r_b)\}$ = 0.102
$L_t/(L \sqrt{Z})$ = 4.4

Figure 5:
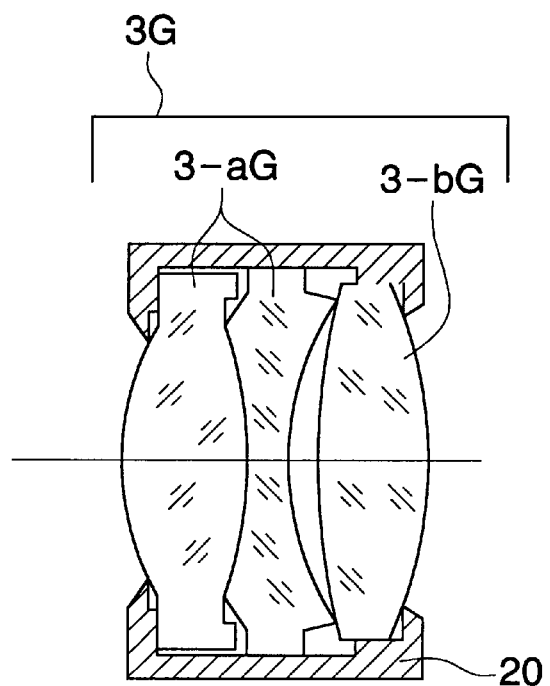
FIG. 5(A) is a sectional view of the optical system of a structure of the third lens group of a zoom lens.
FIG. 5(B) is a sectional view of the optical system when the eccentricity is generated.
Figure 5:
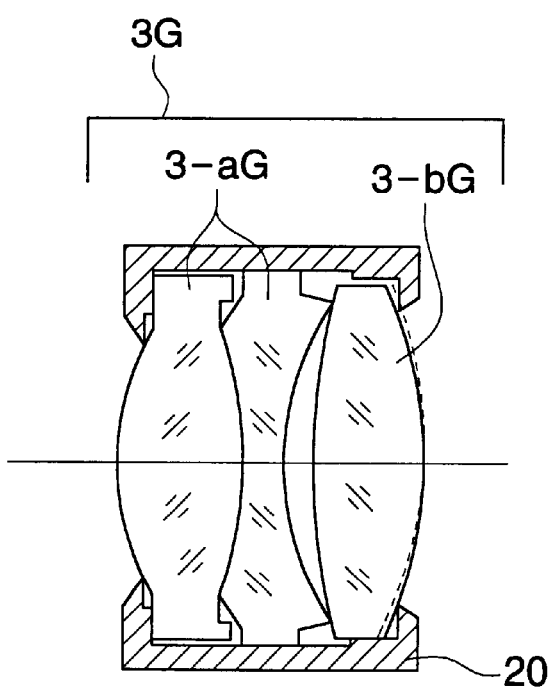

The third lens group of Examples 3, 4, 5, and 6 is structured as follows: as shown in FIGS. 5(A) and 5(B), the third lens group is composed of the (3-a)th lens sub-group (3-aG) in which a positive plastic lens and a negative plastic lens are cemented together, and the (3-b)th lens sub-group (3-bG) which is a positive single lens, and the third lens group is held by making a refraction surface of a lens located closest to the object side of the (3-b)th lens sub-group (3-bG) to be in contact with a surface provided closest to the image side of the (3-a)th lens sub-group (3-aG). When the (3-b)th lens sub-group (3-bG) of the third lens group 3G assembled in a lens frame 20 as shown in FIG. 5(A), causes eccentricity as shown in FIG. 5(B), a refraction surface located closest to the object side of the (3-b)th lens sub-group (3-bG) is held such that the refraction surface is always forced to be in contact with a lens member of the (3-a)th lens sub-group (3-aG) provided closest the image side, therefore, when the refraction surface closest to the object side of the (3-b)th lens sub-group (3-bG) is spherical, there is no change. Accordingly, the eccentricity is generated as an inclination of the surface on the image side of the lens closest to the object side of the (3-b)th lens sub-group (3-bG). An influence of the eccentricity which occurs as the inclination of the refraction surface, onto the image forming performance, such as a partial-blur, or the like, is small, therefore, assembling can be easily carried out.

EXAMPLE 7

In Example 7, the second lens group is composed of the (2-1)th lens which is a negative meniscus lens whose concave surface faces the image side, the (2-2)th plastic lens whose surface on the object side is concave, and an aspherical surface whose curvature increases, as a point on the surface is moved away from the optical axis of the lens toward its periphery, and whose diverging refracting power increases, and (2–3)th bi-convex plastic lens whose surface on the image side has the curvature which increases, as a point on the surface is moved away from the optical axis of the lens toward its periphery, and whose converging refracting power increases; and these (2–2)th lens and (2–3)th lens are cemented together. Further, the third lens group is structured in the same manner as in above Examples 3, 4, 5 and 6.

Figure 14:
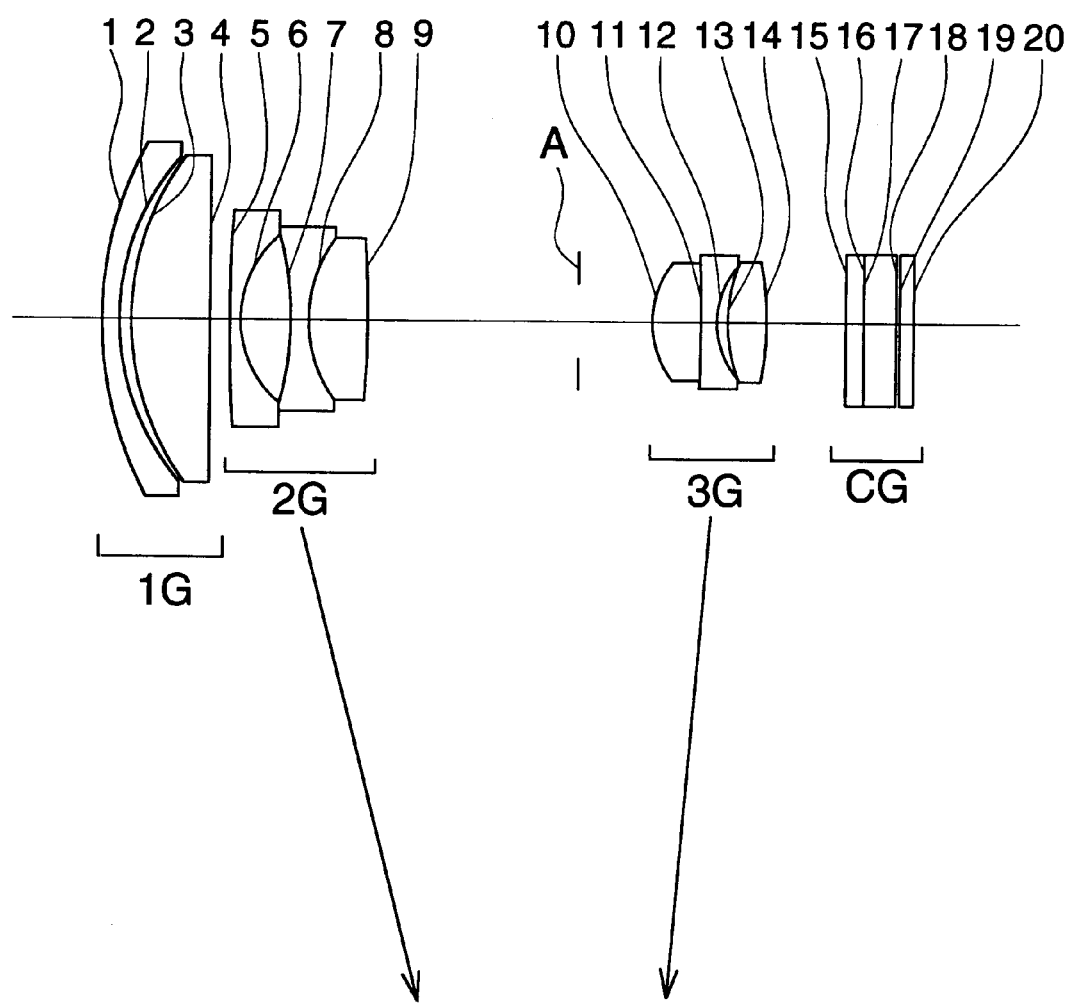
FIG. 14 is a sectional view of an optical system at the wide angle end of Example 7, and shows a movement track at zooming.
Figure 15:
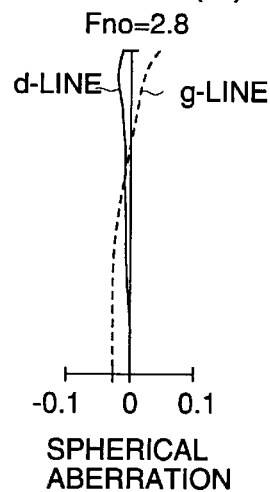
Figure 15:
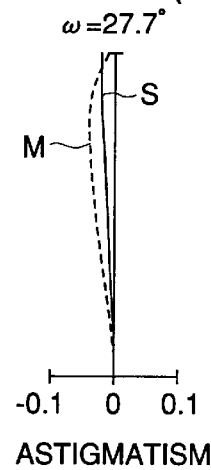
Figure 15:
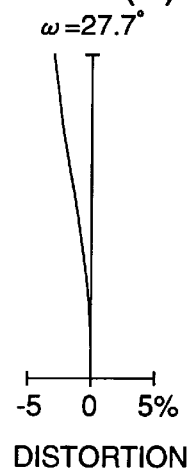
Figure 15:
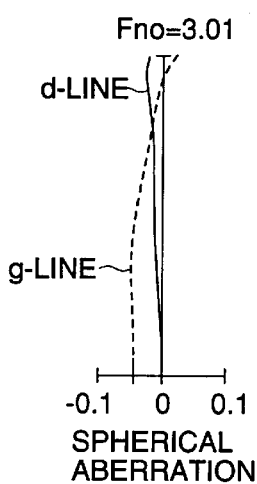
Figure 15:
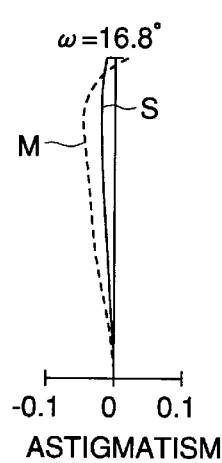
Figure 15:
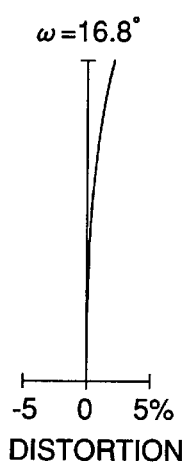
Figure 15:
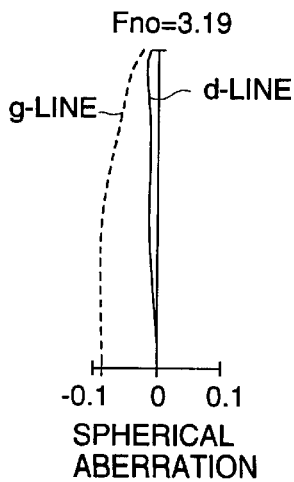
Figure 15:
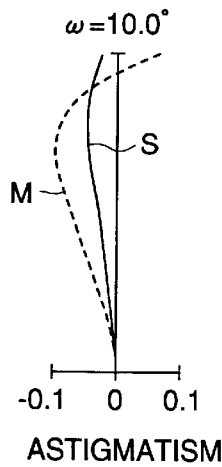
Figure 15:
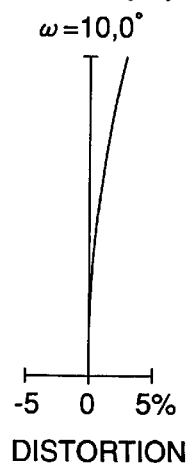

A sectional view of an optical system at the wide angle end of Example 7 is shown in FIG. 14, and lens data of Example 7 is shown in Tables 13 and 14. Views of lens aberrations are shown in FIGS. 15(A)-1 to 15(C)-3. Incidentally, each arrow in FIG. 14 shows a movement track of lens groups when the lens groups are moved in the direction of optical axis during zooming from the wide angle side to the telephoto side.

TABLE 13

| f = 7.00-11.59-19.70, $\omega$ = 27.7°-16.8°-10.0° | | $F_{no}$ = 280 –3.01 –3.19 | |
|---|---|---|---|
| Surface No. | R | D | N | $\nu$ |
| 1 | 21.000 | 1.00 | 1.80518 | 25.4 |
| 2 | 14.228 | 0.50 | | |
| 3 | 14.958 | 4.50 | 1.71300 | 53.9 |
| 4 | 936.559 | 1.10-6.46-11.40 | | |
| 5 | 115.883 | 0.60 | 1.72000 | 50.2 |
| 6 | 6.513 | 2.90 | | |
| 7 | –18.894 | 1.00 | 1.49700 | 56.0 |
| 8 | 7.905 | 3.40 | 1.58300 | 30.0 |
| 9 | –50.052 | 16.12-9.71-4.00 | | |
| 10 | 5.066 | 2.70 | 1.49700 | 56.0 |
| 11 | –323.014 | 1.00 | 1.58300 | 30.0 |
| 12 | 4.677 | 0.60 | | |
| 13 | 11.428 | 2.20 | 1.72916 | 54.7 |
| 14 | –14.267 | 4.44-5.49-6.26 | | |
| 15 | ∞ | 1.00 | 1.52000 | 65.0 |
| 16 | ∞ | 0.00 | | |
| 17 | ∞ | 1.89 | 1.54880 | 67.0 |
| 18 | ∞ | 0.20 | | |
| 19 | ∞ | 0.75 | 1.51633 | 64.1 |
| 20 | ∞ | | | |

TABLE 14

| Surface | Aspherical surface coefficients | Surface | Aspherical surface coefficients |
|---|---|---|---|
| The 7$^{th}$ surface | K = 1.05130<br>$A_4$ = –6.68720 × 10$^{-7}$<br>$A_6$ = 5.61800 × 10$^{-7}$<br>$A_8$ = –2.87010 × 10$^{-8}$<br>$A_{10}$ = –2.14710 × 10$^{-9}$ | The 9$^{th}$ surface | K = 34.1110<br>$A_4$ = –7.62540 × 10$^{-5}$<br>$A_6$ = –3.49440 × 10$^{-7}$<br>$A_8$ = 2.86020 × 10$^{-8}$<br>$A_{10}$ = –2.89120 × 10$^{-9}$ |
| The 10$^{th}$ surface | K = –0.73458<br>$A_4$ = 6.15850 × 10$^{-6}$<br>$A_6$ = –2.05190 × 10$^{-5}$<br>$A_8$ = 2.10840 × 10$^{-6}$<br>$A_{10}$ = –1.03060 × 10$^{-7}$ | The 12$^{th}$ surface | K = –0.45967<br>$A_4$ = 4.18730 × 10$^{-5}$<br>$A_6$ = –3.50520 × 10$^{-5}$<br>$A_8$ = 2.27010 × 10$^{-6}$<br>$A_{10}$ = –1.67440 × 10$^{-7}$ |
| $\beta_{3T}$ = –0.59<br>$(\beta_{2T}/\beta_{2W}) \cdot (\beta_{3W}/\beta_{3T})$ = 1.49<br>$f_W/f_1$ = 0.21<br>$f_W/f_2$ = –0.73<br>$f_1/f_3$ = 2.96<br>$f_W/f_{3-a}$ = 0.021 | | $f_W/f_{2R}$ = –0.021<br>$\nu_{22}$ = 56.0<br>$\nu_{23}$ = 30.0<br>L = 7.14<br>$S/\{L^2(1/r_a - 1/r_b)\}$ = 0.093<br>$Lt/(L\sqrt{Z})$ = 4.3 | |

EXAMPLES 8 AND 9

Figure 16:
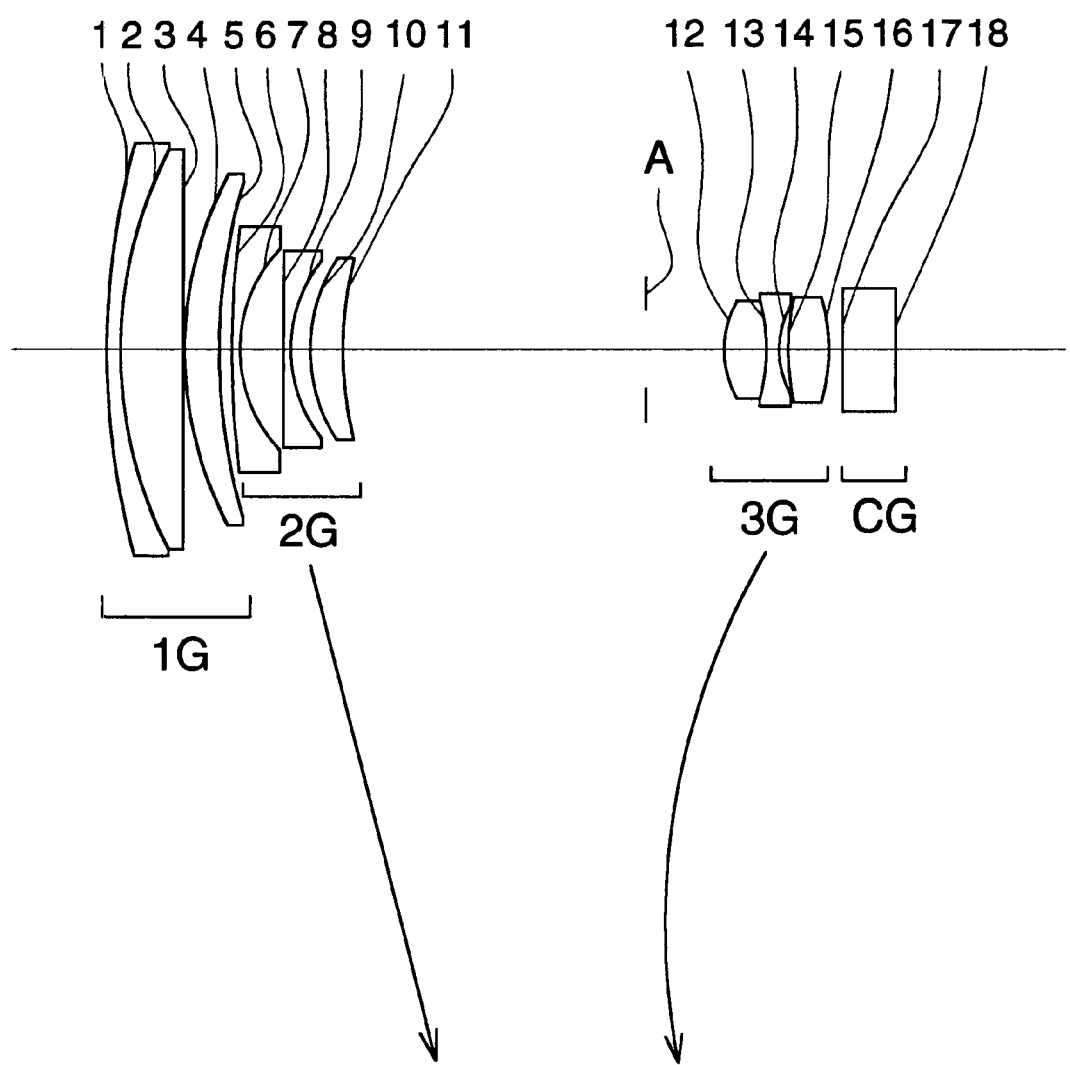
FIG. 16 is a sectional view of an optical system at the wide angle end of Example 8, and shows a movement track at zooming.
Figure 17:
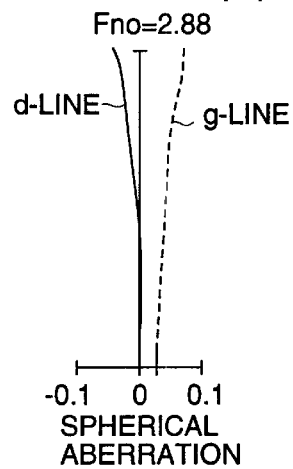
Figure 17:
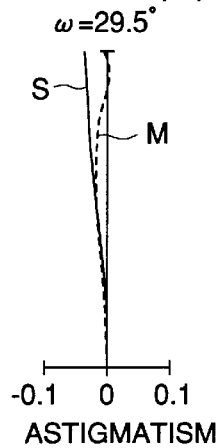
Figure 17:
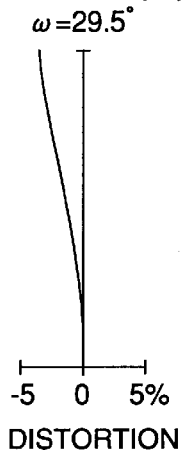
Figure 17:
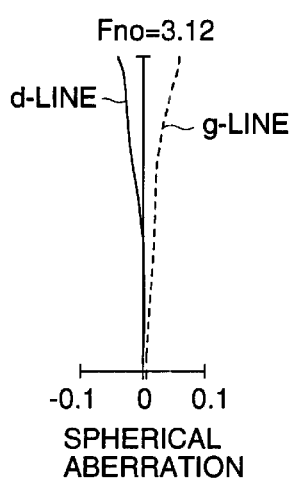
Figure 17:
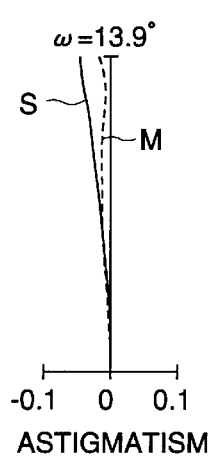
Figure 17:
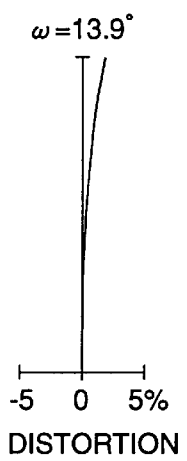
Figure 17:
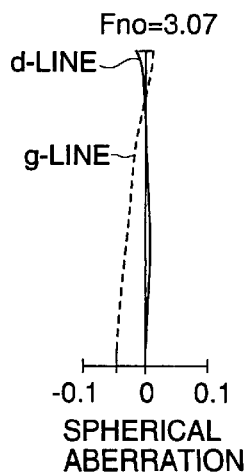
Figure 17:
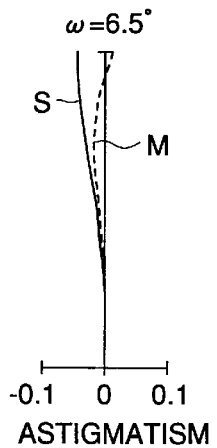
Figure 17:
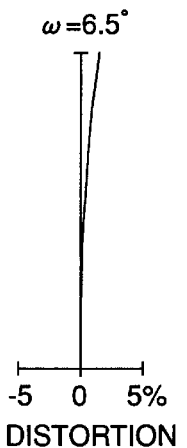

A sectional view of an optical system at the wide angle end of Example 8 is shown in FIG. 16, and lens data of Example 8 is shown in Tables 15 and 16. Views of lens aberrations are shown in FIGS. 17(A)-1 to 17(C)-3. Incidentally, each arrow in FIG. 16 shows a movement track of lens groups when the lens groups are moved in the direction of optical axis during zooming from the wide angle side to the telephoto side.

TABLE 15

| f = 6.70-14.50-31.60, $\omega$ = 29.5°-13.9°-6.5° | | $F_{no}$ = 2.88 –3.12 –3.07 | |
|---|---|---|---|
| Surface No. | R | D | N | $\nu$ |
| 1 | 52.472 | 1.00 | 1.84666 | 23.8 |
| 2 | 30.724 | 4.60 | 1.69680 | 55.5 |
| 3 | –642.506 | 0.20 | | |
| 4 | 27.575 | 2.50 | 1.58913 | 61.2 |
| 5 | 46.273 | 0.90-12.19-21.90 | | |
| 6 | 74.699 | 0.60 | 1.71300 | 53.9 |
| 7 | 10.619 | 3.00 | | |
| 8 | 456.734 | 0.60 | 1.71300 | 53.9 |
| 9 | 9.997 | 1.50 | | |
| 10 | 11.586 | 2.40 | 1.84666 | 23.8 |
| 11 | 27.570 | 27.65-14.97-5.50 | | |
| 12 | 6.248 | 3.00 | 1.49700 | 56.0 |
| 13 | –22.421 | 1.00 | 1.58300 | 30.0 |
| 14 | 6.570 | 0.70 | | |
| 15 | 16.340 | 3.00 | 1.69350 | 53.2 |
| 16 | –13.897 | 1.00-2.39-2.15 | | |
| 17 | ∞ | 3.91 | 1.51633 | 64.1 |
| 18 | ∞ | | | |

TABLE 16

| Surface | Aspherical surface coefficients |
|---|---|
| The 12$^{th}$ surface | K = –6.73110 × 10$^{-1}$<br>$A_4$ = 2.96430 × 10$^{-4}$<br>$A_6$ = 3.61810 × 10$^{-6}$<br>$A_8$ = –7.68130 × 10$^{-8}$<br>$A_{10}$ = –4.33420 × 10$^{-8}$ |
| The 14$^{th}$ surface | K = 1.26560 × 10$^{-1}$<br>$A_4$ = 2.32010 × 10$^{-4}$<br>$A_6$ = –5.65550 × 10$^{-6}$<br>$A_8$ = –1.26490 × 10$^{-8}$<br>$A_{10}$ = 1.10860 × 10$^{-8}$ |
| The 16$^{th}$ surface | K = 2.46720 × 10$^{-1}$<br>$A_4$ = 4.03760 × 10$^{-4}$<br>$A_6$ = –4.50080 × 10$^{-6}$<br>$A_8$ = 9.36630 × 10$^{-8}$<br>$A_{10}$ = –6.40120 × 10$^{-8}$ |
| $\beta_{3T}$ = –0.424<br>$(\beta_{2T}/\beta_{2W}) \cdot (\beta_{3W}/\beta_{3T})$ = 2.89<br>$f_W/f_1$ = 0.14<br>$f_W/f_2$ = –0.55 | $f_1/f_3$ = 3.54<br>$f_W/f_{3-a}$ = 0.04<br>L = 7.32<br>$S/\{L^2(1/r_a - 1/r_b)\}$ = 0.144 |
| $Lt/(L\sqrt{Z})$ = 4.3 | |

Figure 18:
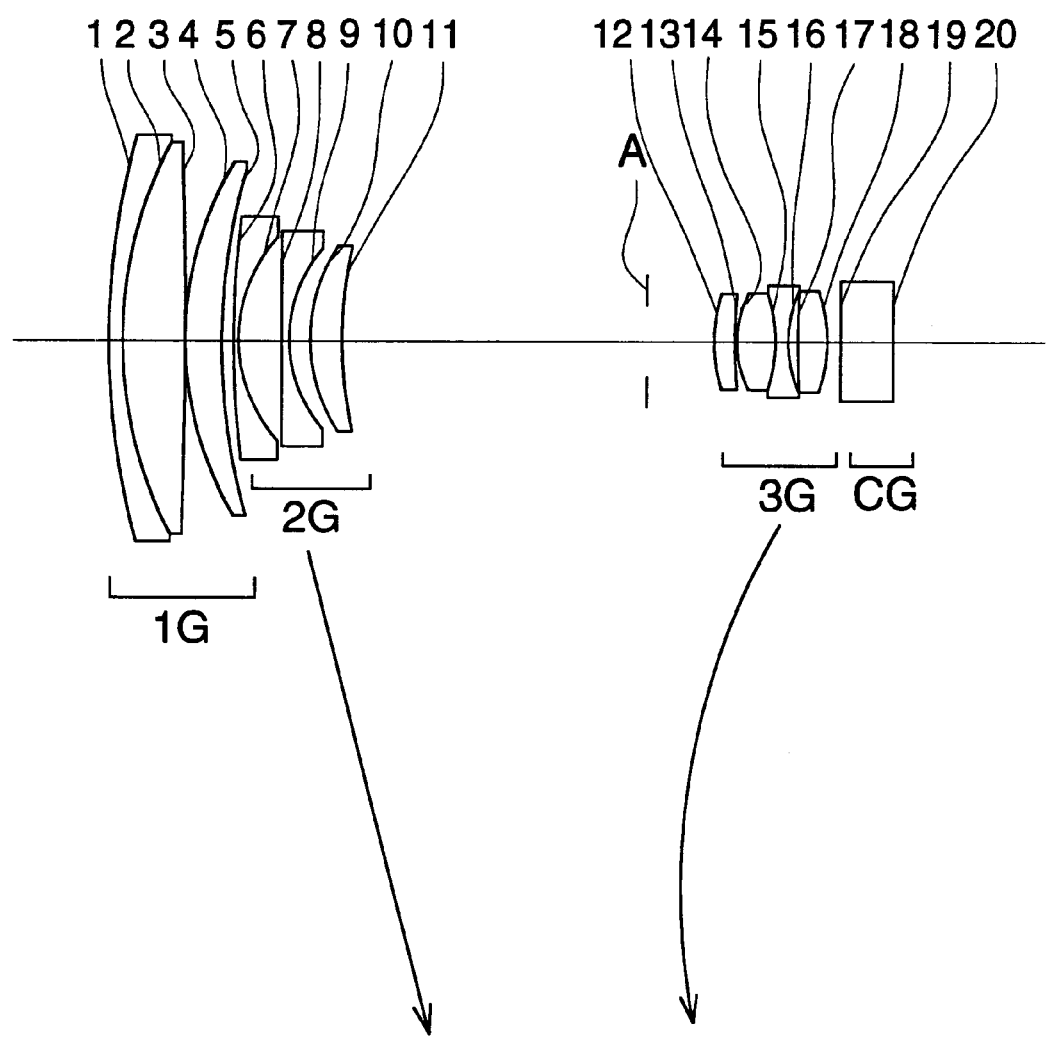
FIG. 18 is a sectional view of an optical system at the wide angle end of Example 9, and shows a movement track at zooming.
Figure 19:
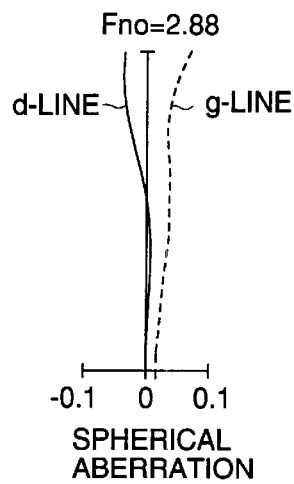
Figure 19:
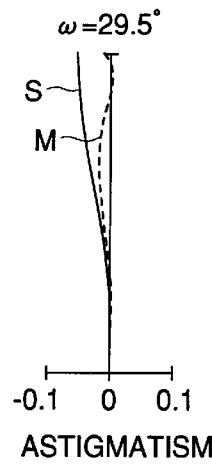
Figure 19:
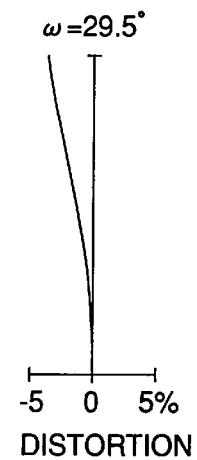
Figure 19:
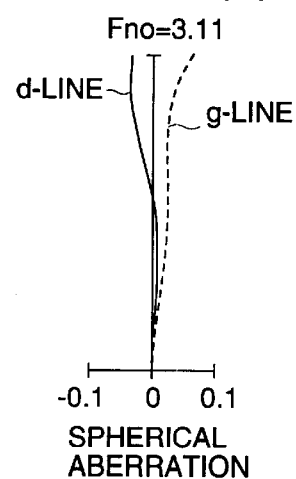
Figure 19:
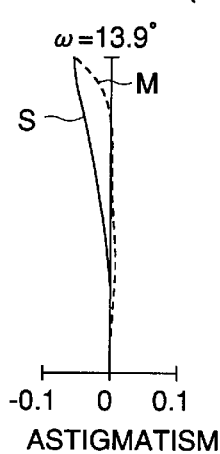
Figure 19:
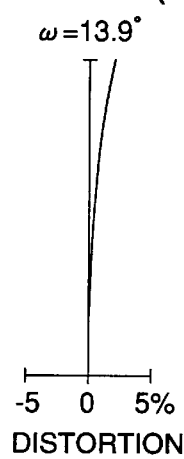
Figure 19:
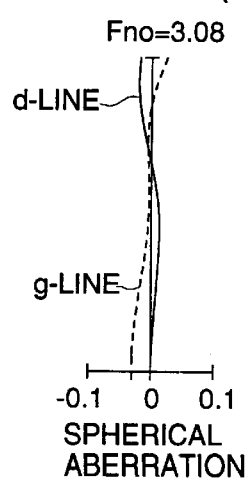
Figure 19:
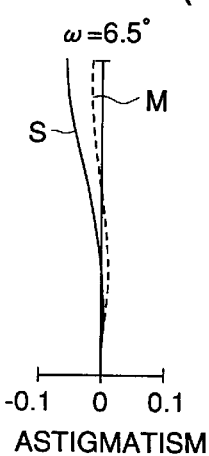
Figure 19:
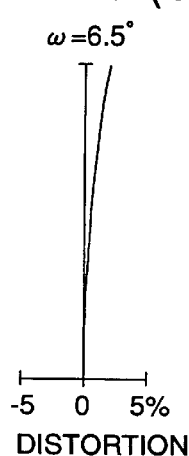

A sectional view of an optical system at the wide angle end of Example 9 is shown in FIG. 18. Views of lens aberrations are shown in FIGS. 19(A)-1 to 19(C)-3, and lens data of Example 9 is shown in Tables 17 and 18. Incidentally, each arrow in FIG. 18 shows a movement track of lens groups when the lens groups are moved in the direction of optical axis during zooming from the wide angle side to the telephoto side.

TABLE 17

| f = 6.70-14.50-31.60, $\omega$ = 29.5°-13.9°-6.5° | | $F_{no}$ = 2.88 –3.11 –3.08 | |
|---|---|---|---|
| Surface No. | R | D | N | $\nu$ |
| 1 | 51.430 | 1.00 | 1.84666 | 23.8 |
| 2 | 30.112 | 4.60 | 1.69680 | 55.5 |
| 3 | –589.197 | 0.20 | | |
| 4 | 25.879 | 2.50 | 1.51633 | 64.1 |

TABLE 17-continued

| | | | | |
|---|---|---|---|---|
| 5 | 43.495 | 0.90-12.20-21.90 | | |
| 6 | 63.127 | 0.60 | 1.71300 | 53.9 |
| 7 | 11.494 | 3.00 | | |
| 8 | -896.472 | 0.60 | 1.71300 | 53.9 |
| 9 | 9.535 | 1.50 | | |
| 10 | 11.277 | 2.40 | 1.84666 | 23.8 |
| 11 | 25.479 | 27.71-15.02-5.50 | | |
| 12 | 11.886 | 1.50 | 1.48749 | 70.2 |
| 13 | 25.023 | 0.20 | | |
| 14 | 7.304 | 2.80 | 1.49700 | 56.0 |
| 15 | -14.016 | 1.00 | 1.58300 | 30.0 |
| 16 | 8.568 | 0.70 | | |
| 17 | 398.535 | 2.20 | 1.69350 | 53.2 |
| 18 | -10.947 | 1.00-2.38-2.21 | | |
| 19 | ∞ | 3.91 | 1.51633 | 64.1 |
| 20 | ∞ | | | |

TABLE 18

| Surface | Aspherical surface coefficients |
|---|---|
| The 14$^{th}$ surface | $K = -6.50500 \times 10^{-1}$ <br> $A_4 = 2.36390 \times 10^{-5}$ <br> $A_6 = 1.43340 \times 10^{-5}$ <br> $A_8 = -1.37790 \times 10^{-6}$ <br> $A_{10} = 3.88970 \times 10^{-8}$ |
| The 16$^{th}$ surface | $K = 0.19157$ <br> $A_4 = 1.72630 \times 10^{-5}$ <br> $A_6 = -1.67880 \times 10^{-6}$ <br> $A_8 = -1.18100 \times 10^{-6}$ <br> $A_{10} = 1.79070 \times 10^{-8}$ |
| The 18$^{th}$ surface | $K = 1.65280 \times 10^{-1}$ <br> $A_4 = 6.77660 \times 10^{-7}$ <br> $A_6 = 3.27440 \times 10^{-7}$ <br> $A_8 = -1.09770 \times 10^{-7}$ <br> $A_{10} = -8.29010 \times 10^{-9}$ |

$\beta_{3T} = -0.43$
$(\beta_{2T}/\beta_{2W}) \cdot (\beta_{3W}/\beta_{3T}) = 2.90$
$f_W/f_1 = 0.14$
$f_W/f_2 = -0.55$
$f_1/f_3 = 3.62$
$f_W/f_{3-a} = 0.04$
$L = 7.32$
$S/\{L^2(1/r_a - 1/r_b)\} = 0.144$ $Lt/(L\sqrt{Z}) = 4.3$

EXAMPLE 10

Figure 20:
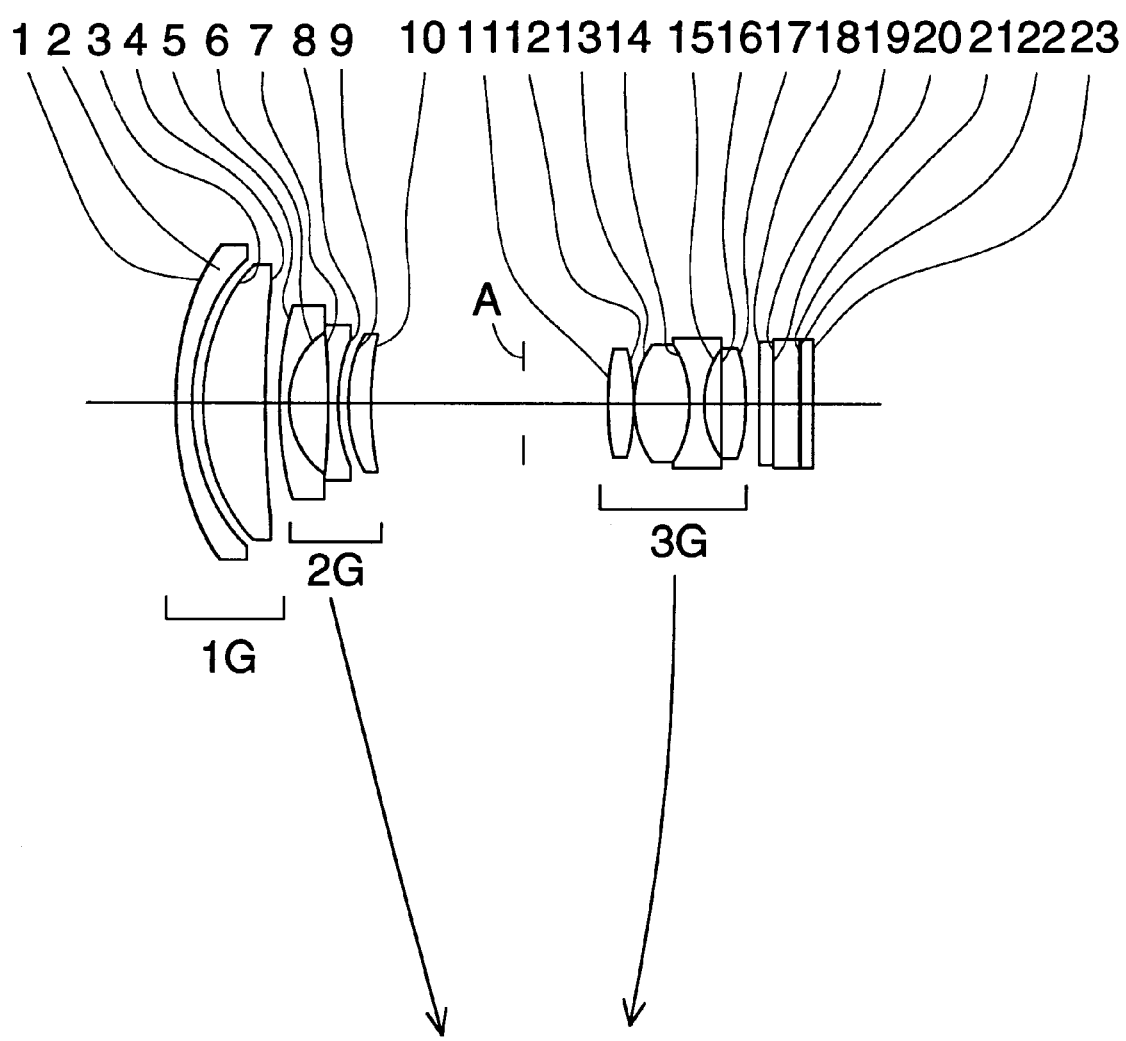
FIG. 20 is a sectional view of an optical system at the wide angle end of Examples 10, 11, 12, and shows a movement track at zooming.
Figure 21:
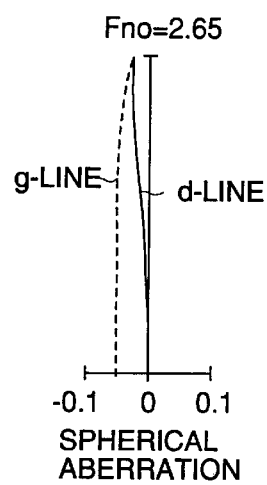
Figure 21:
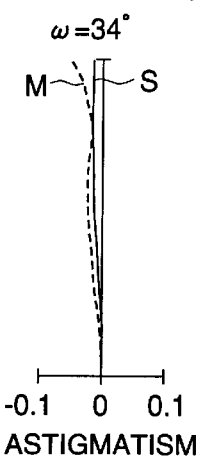
Figure 21:
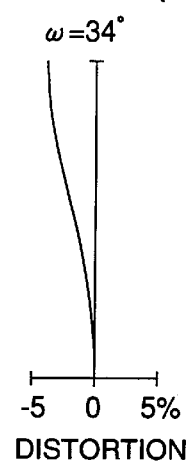
Figure 21:
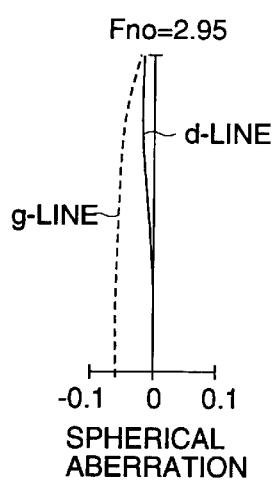
Figure 21:
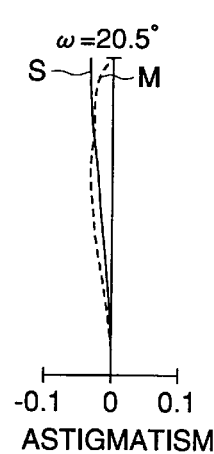
Figure 21:
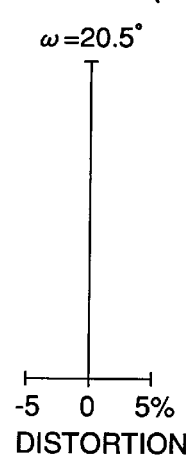
Figure 21:
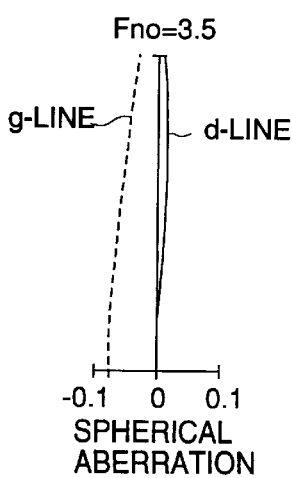
Figure 21:
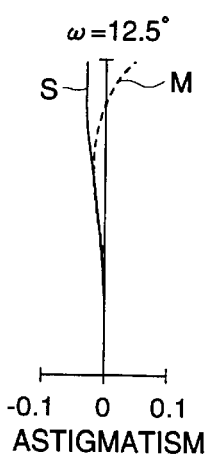
Figure 21:
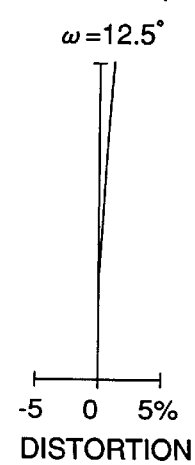
Figure 22:
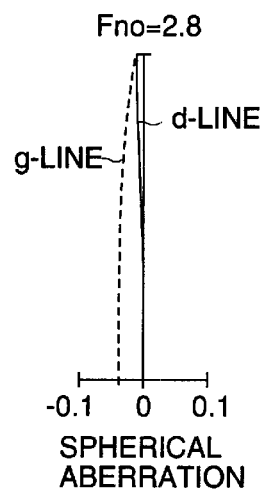
Figure 22:
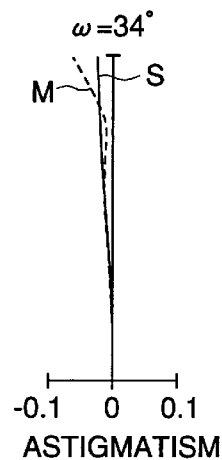
Figure 22:
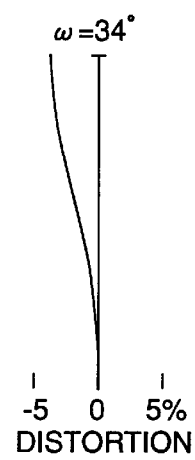
Figure 22:
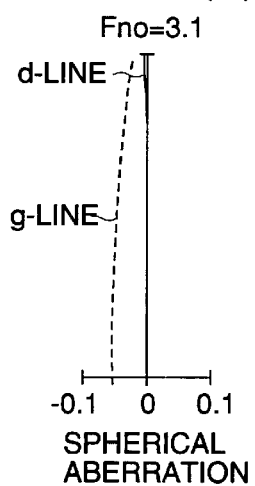
Figure 22:
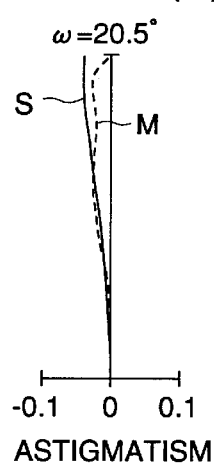
Figure 22:
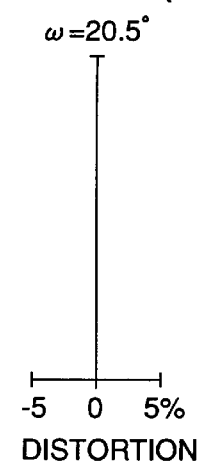
Figure 22:
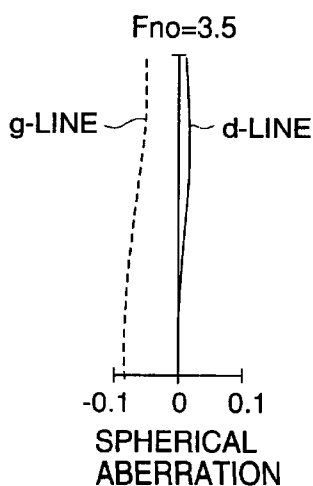
Figure 22:
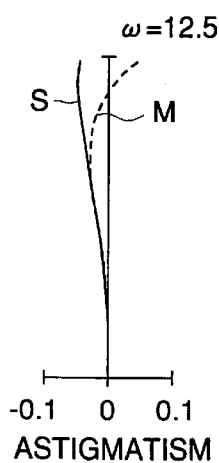
Figure 22:
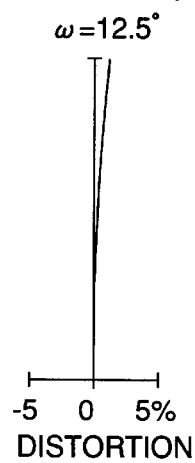
Figure 23:
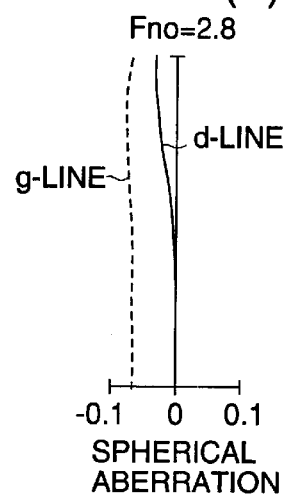
Figure 23:
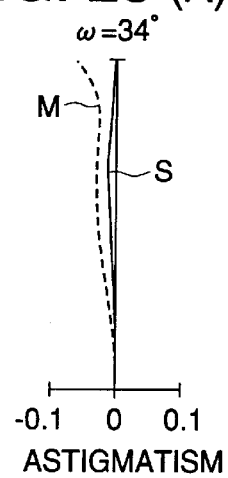
Figure 23:
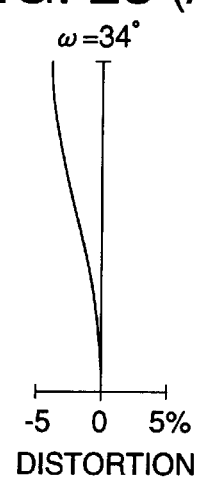
Figure 23:
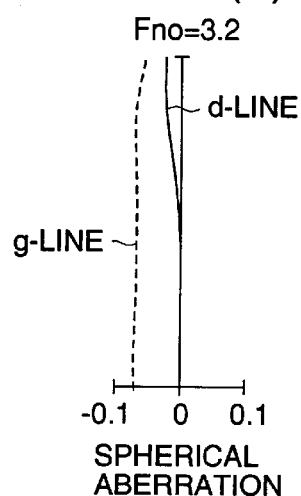
Figure 23:
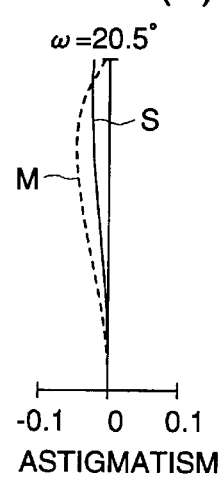
Figure 23:
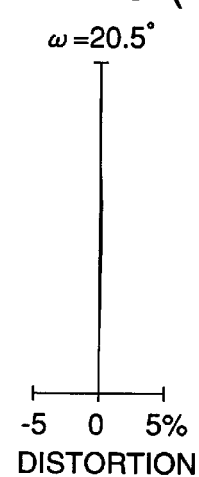
Figure 23:
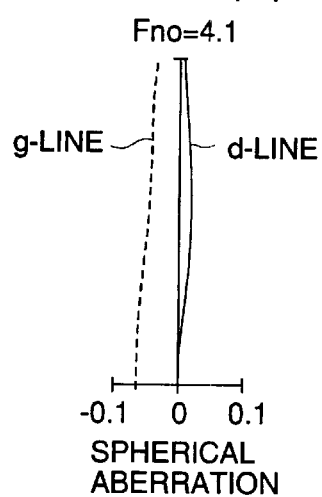
Figure 23:
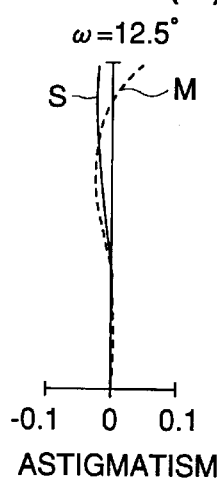
Figure 23:
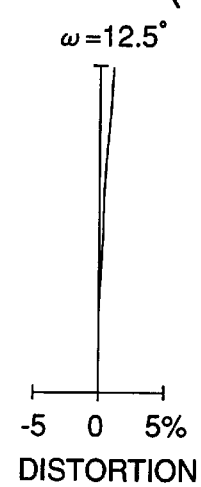

A sectional view of an optical system at the wide angle end of Example 10 is shown in FIG. 20. Views of lens aberrations are shown in FIGS. 21(A)-1 to 21(C)-3, and lens data of Example 10 is shown in Tables 19 and 20. Incidentally, each arrow in FIG. 20 shows a movement track of lens groups when the lens groups are moved in the direction of optical axis during zooming from the wide angle side to the telephoto side.

TABLE 19

| f = 5.5–9.6—16.0, | | $F_{no}$ = 2.65-2.95-3.5 | ω = 34.0°-20.5°-12.5° | |
|---|---|---|---|---|
| Surface No. | R | D | N | ν |
| 1 | 20.799 | 1.00 | 1.80518 | 25.4 |
| 2 | 13.875 | 0.80 | | |
| 3 | 14.320 | 4.70 | 1.72916 | 54.7 |
| 4 | 77.478 | 1.00–6.99–10.70 | | |
| 5 | 21.245 | 0.60 | 1.77250 | 49.6 |
| 6 | 5.769 | 3.00 | | |
| 7 | -135.636 | 0.60 | 1.72916 | 54.7 |
| 8 | 10.447 | 0.80 | | |
| 9 | 9.457 | 1.81 | 1.84666 | 23.8 |
| 10 | 25.691 | 17.34–9.85–4.0 | | |

TABLE 19-continued

| f = 5.5–9.6—16.0, | | $F_{no}$ = 2.65-2.95-3.5 | ω = 34.0°-20.5°-12.5° | |
|---|---|---|---|---|
| Surface No. | R | D | N | ν |
| 11 | 19.184 | 1.80 | 1.58913 | 61.2 |
| 12 | -22.515 | 0.20 | | |
| 13 | 6.922 | 4.00 | 1.49700 | 56.0 |
| 14 | -7.067 | 1.10 | 1.58300 | 30.0 |
| 15 | 7.534 | 1.20 | | |
| 16 | -455.311 | 1.80 | 1.72916 | 54.7 |
| 17 | -11.787 | 1.00–2.50–4.64 | | |
| 18 | ∞ | 1.00 | 1.52000 | 65.0 |
| 19 | ∞ | 0.00 | | |
| 20 | ∞ | 1.89 | 1.54880 | 67.0 |
| 21 | ∞ | 0.20 | | |
| 22 | ∞ | 0.75 | 1.51633 | 64.1 |
| 23 | ∞ | | | |

TABLE 20

| Surface | Aspherical surface coefficients |
|---|---|
| The 13$^{th}$ surface | $K = 3.0439 \times 10^{-1}$ <br> $A_4 = -5.3734 \times 10^{-5}$ <br> $A_6 = -2.3467 \times 10^{-6}$ <br> $A_8 = -3.2658 \times 10^{-7}$ <br> $A_{10} = 1.2268 \times 10^{-8}$ |
| The 15$^{th}$ surface | $K = 2.1063$ <br> $A_4 = 2.5625 \times 10^{-4}$ <br> $A_6 = -3.3019 \times 10^{-5}$ <br> $A_8 = 8.6036 \times 10^{-7}$ <br> $A_{10} = -1.4175 \times 10^{-7}$ |

$(\beta_{2T}/\beta_{2W}) \cdot (\beta_{3W}/\beta_{3T}) = 0.83$
$\beta_{3T} = -0.76$
$f_W/f_1 = 0.13$
$f_W/f_{3-a} = 0.015$
$S/\{L^2(1/r_a - 1/r_b)\} = 0.174$ $Lt/(L\sqrt{Z}) = 4.2$

EXAMPLE 11

A sectional view of an optical system at the wide angle end of Example 11 is shown in FIG. 20. Views of lens aberrations are shown in FIGS. 22(A)-1 to 22(C)-3, and lens data of Example 11 is shown in Tables 21 and 22. Incidentally, each arrow in FIG. 20 shows a movement track of lens groups when the lens groups are moved in the direction of optical axis during zooming from the wide angle side to the telephoto side.

TABLE 21

| f = 5.5 –9.6 –16.0, <br> ω = 34.0°-20.5°-12.5° | | | $F_{no}$ = 2.8 -3.1 -3.5 | |
|---|---|---|---|---|
| Surface No. | R | D | N | ν |
| 1 | 20.393 | 1.00 | 1.80518 | 25.4 |
| 2 | 13.944 | 0.80 | | |
| 3 | 14.404 | 5.00 | 1.69680 | 55.5 |
| 4 | 99.499 | 1.00-7.15-11.40 | | |
| 5 | 26.037 | 0.60 | 1.72916 | 54.7 |
| 6 | 5.903 | 3.00 | | |
| 7 | 716.294 | 0.60 | 1.69680 | 55.5 |
| 8 | 9.737 | 0.80 | | |
| 9 | 8.877 | 1.80 | 1.84666 | 23.8 |
| 10 | 19.727 | 17.42-9.95-4.0 | | |
| 11 | 37.087 | 2.00 | 1.58913 | 61.2 |
| 12 | -17.560 | 0.20 | | |
| 13 | 6.953 | 3.80 | 1.49700 | 56.0 |

TABLE 21-continued

| | | | | |
|---|---|---|---|---|
| 14 | −8.183 | 1.10 | 1.58300 | 30.0 |
| 15 | 7.580 | 1.50 | | |
| 16 | 176.931 | 2.20 | 1.72916 | 54.7 |
| 17 | −10.743 | 1.00-2.32-4.02 | | |
| 18 | ∞ | 1.00 | 1.52000 | 65.0 |
| 19 | ∞ | 0.00 | | |
| 20 | ∞ | 1.89 | 1.54880 | 67.0 |
| 21 | ∞ | 0.20 | | |
| 22 | ∞ | 0.75 | 1.51633 | 64.1 |
| 23 | ∞ | | | |

TABLE 22

| Surface | Aspherical surface coefficients |
|---|---|
| The 13$^{th}$ surface | $K = 7.2955 \times 10^{-2}$ |
| | $A_4 = -4.8574 \times 10^{-5}$ |
| | $A_6 = -4.5715 \times 10^{-6}$ |
| | $A_8 = -8.5068 \times 10^{-8}$ |
| | $A_{10} = 3.0967 \times 10^{-9}$ |
| The 15$^{th}$ surface | $K = 1.3890$ |
| | $A_4 = 2.2612 \times 10^{-4}$ |
| | $A_6 = -2.8624 \times 10^{-5}$ |
| | $A_8 = 4.7861 \times 10^{-7}$ |
| | $A_{10} = -4.9570 \times 10^{-8}$ |

$(\beta_{2T}/\beta_{2W}) \cdot (\beta_{3W}/\beta_{3T}) = 0.97$
$\beta_{3T} = -0.68$
$f_W/f_1 = 0.14$
$f_W/f_{3-a} = 0.018$
$S/\{L^2(1/r_a - 1/r_b)\} = 0.233$ $Lt/(L\sqrt{Z}) = 4.3$

EXAMPLE 12

A sectional view of an optical system at the wide angle end of Example 12 is shown in FIG. 20. Views of lens aberrations are shown in FIGS. 23(A)-1 to 23(C)-3, and lens data of Example 12 is shown in Tables 23 and 24.

TABLE 23

| f = 5.5 −9.6 −16.0, F$_{no}$ = 2.8 −3.2 −4.1 | | | | |
|---|---|---|---|---|
| ω = 34.0° - 20.5° - 12.5° | | | | |
| Surface No. | R | D | N | ν |
| 1 | 21.348 | 1.00 | 1.80518 | 25.4 |
| 2 | 13.888 | 0.80 | | |
| 3 | 14.344 | 4.70 | 1.69680 | 55.5 |
| 4 | 83.028 | 1.00-6.93-10.09 | | |
| 5 | 16.598 | 0.60 | 1.72916 | 54.7 |
| 6 | 5.477 | 3.40 | | |
| 7 | −51.918 | 0.60 | 1.72916 | 54.7 |
| 8 | 12.725 | 0.80 | | |
| 9 | 9.910 | 2.00 | 1.84666 | 23.8 |
| 10 | 23.288 | 17.42-9.81-4.0 | | |
| 11 | 11.685 | 2.50 | 1.58913 | 61.2 |
| 12 | −31.100 | 0.20 | | |
| 13 | 6.875 | 4.00 | 1.49700 | 56.0 |
| 14 | −6.384 | 1.10 | 1.58300 | 30.0 |
| 15 | 7.307 | 1.20 | | |
| 16 | 44.908 | 1.80 | 1.72916 | 54.7 |
| 17 | −29.625 | 1.00-2.68-5.33 | | |
| 18 | ∞ | 1.00 | 1.52000 | 65.0 |
| 19 | ∞ | 0.00 | | |
| 20 | ∞ | 1.89 | 1.54880 | 67.0 |
| 21 | ∞ | 0.20 | | |
| 22 | ∞ | 0.75 | 1.51633 | 64.1 |
| 23 | ∞ | | | |

TABLE 24

| Surface | Aspherical surface coefficients |
|---|---|
| The 13$^{th}$ surface | $K = 6.7214 \times 10^{-1}$ |
| | $A_4 = -1.6051 \times 10^{-1}$ |
| | $A_6 = 2.2861 \times 10^{-6}$ |
| | $A_8 = -1.1151 \times 10^{-6}$ |
| | $A_{10} = 2.9485 \times 10^{-8}$ |
| The 15$^{th}$ surface | $K = 2.6702$ |
| | $A_4 = 4.1163 \times 10^{-4}$ |
| | $A_6 = -2.6811 \times 10^{-5}$ |
| | $A_8 = 1.1166 \times 10^{-6}$ |
| | $A_{10} = -3.3788 \times 10^{-7}$ |

$(\beta_{2T}/\beta_{2W}) \cdot (\beta_{3W}/\beta_{3T}) = 0.68$
$\beta_{3T} = -0.85$
$F_W/f_1 = 0.12$
$F_W/f_{3-a} = 0.003$
$S/\{L^2(1/r_a - 1/r_b)\} = 0.205$ $Lt/(L\sqrt{Z}) = 4.2$

EXAMPLE 13

Figure 24:
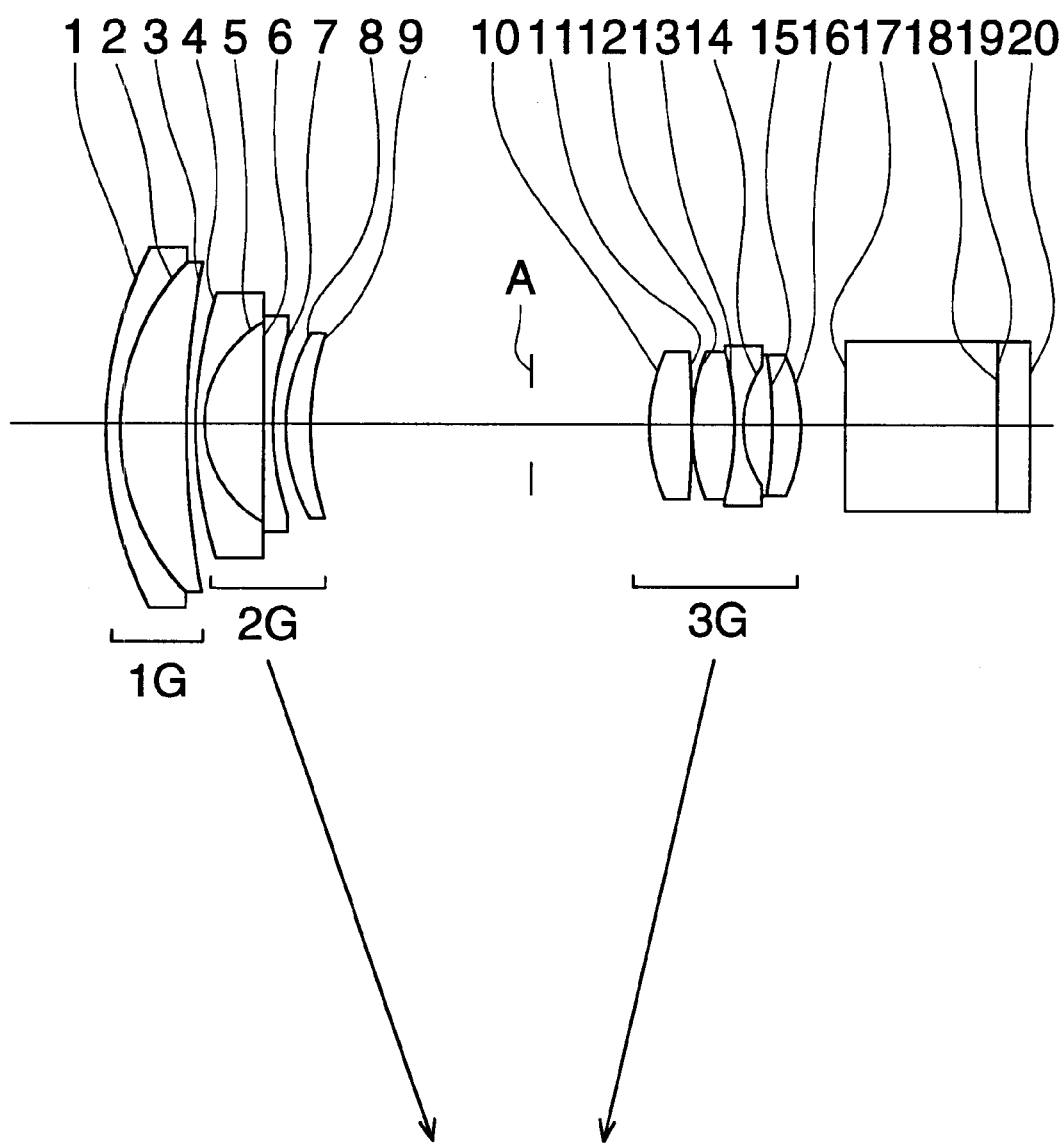
FIG. 24 shows a sectional view of an optical system at the wide angle end of Example 13 and a movement track at zooming.
Figure 25:
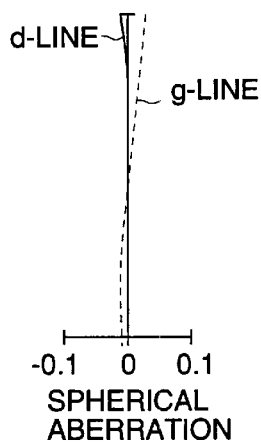
Figure 25:
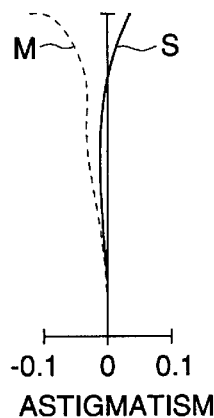
Figure 25:
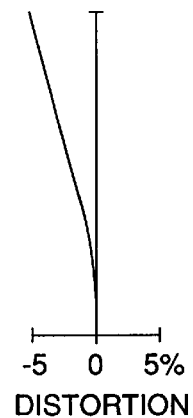
Figure 25:
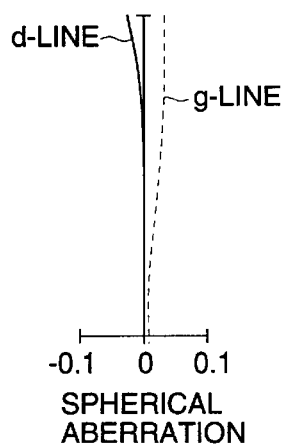
Figure 25:
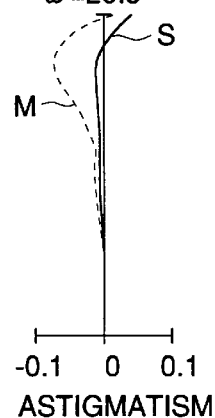
Figure 25:
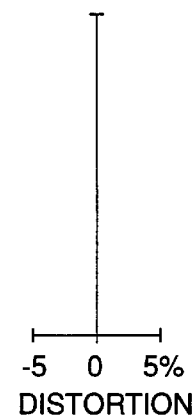
Figure 25:
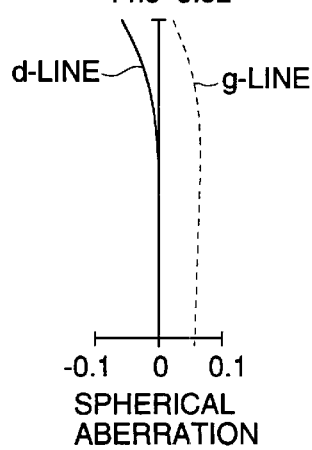
Figure 25:
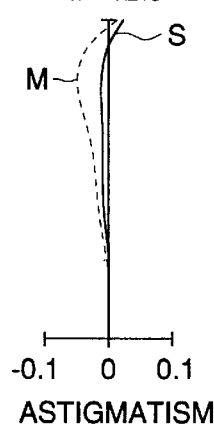
Figure 25:
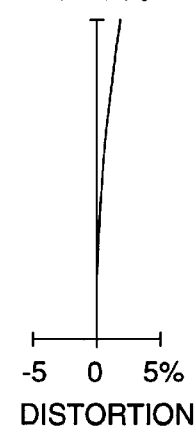

The first lens is structured by a lens in which a negative lens and a positive lens are cemented together; the lens has a sufficient back focus although the overall length of the lens is reduced; and an optical path dividing means such as a beam splitter, or the like, to guide flux of rays passing through the picture taking lens to a viewing optical system, can be inserted into the back of the lens. A sectional view of an optical system at the wide angle end of Example 13 is shown in FIG. 24. Views of lens aberrations are shown in FIGS. 25(A)-1 to 25(C)-3, and lens data of Example 13 is shown in Tables 25 and 26.

Incidentally, each arrow in FIG. 24 shows a movement track of lens groups when the lens groups are moved in the direction of optical axis during zooming from the wide angle side to the telephoto side.

TABLE 25

| f = 9.0 −15.2 −25.6, F$_{no}$ = 2.80 −3.06 −3.52 | | | | |
|---|---|---|---|---|
| ω = 33.9° - 20.8° - 12.5° | | | | |
| Surface No. | R | D | N | ν |
| 1 | 30.293 | 1.00 | 1.80518 | 25.4 |
| 2 | 18.330 | 5.00 | 1.77250 | 49.6 |
| 3 | 89.419 | 0.40-8.95-15.5 | | |
| 4 | 32.080 | 0.60 | 1.69680 | 55.5 |
| 5 | 8.419 | 4.60 | | |
| 6 | −81.778 | 0.60 | 1.60311 | 60.7 |
| 7 | 24.240 | 1.00 | | |
| 8 | 13.228 | 1.80 | 1.84666 | 23.8 |
| 9 | 21.394 | 25.67-15.34-6.40 | | |
| 10 | 13.327 | 2.80 | 1.83400 | 37.2 |
| 11 | −222.105 | 0.20 | | |
| 12 | 12.965 | 3.20 | 1.69350 | 53.2 |
| 13 | −19.129 | 0.60 | 1.80518 | 25.4 |
| 14 | 8.340 | 2.00 | | |
| 15 | −53.932 | 2.20 | 1.69350 | 53.2 |
| 16 | −13.294 | 3.50-5.29-7.68 | | |
| 17 | ∞ | 11.50 | 1.51633 | 64.1 |
| 18 | ∞ | 0.00 | | |
| 19 | ∞ | 2.40 | 1.54880 | 67.0 |
| 20 | ∞ | | | |

TABLE 26

| Surface | Aspherical surface coefficients |
|---|---|
| The 12th surface | $K = -9.76490 \times 10^{-2}$ |
| | $A_4 = -9.54380 \times 10^{-5}$ |
| | $A_6 = -1.34620 \times 10^{-6}$ |
| | $A_8 = 9.24960 \times 10^{-10}$ |
| | $A_{10} = -3.75860 \times 10^{-10}$ |
| The 15th surface | $K = 54.4000$ |
| | $A_4 = -6.08920 \times 10^{-6}$ |
| | $A_6 = 3.92120 \times 10^{-6}$ |
| | $A_8 = -1.12810 \times 10^{-7}$ |
| | $A_{10} = 5.96300 \times 10^{-9}$ |
| $\beta_{3T} = -0.676$ | $f_1/f_3 = 3.93$ |
| $(\beta_{2T}/\beta_{2W}) \cdot (\beta_{3W}/\beta_{3T}) = 0.978$ | $Lt/L \sqrt{Z} = 3.6$ |
| $f/f1 = 0.15$ | $L = 11.52$ |
| $f_W/f_2 = -0.62$ | $S/\{L^2(1/r_a - 1/r_b)\} = 0.109$ |

In these Examples, an aperture is located between the second lens group and the third lens group, and may be fixed therebetween or moved together with the third lens group, at the magnification change from the wide angle end to the telephoto end. Further, focusing onto the photographic object is carried out by moving the third lens group, and as the distance from the object is shorter, it is better to move the third lens group toward the object side, and further, focusing can also be carried out by moving the first lens group or the second lens group. When focusing is conducted by the third lens group, macro photography becomes possible near the wide angle end.

As can clearly be seen from each aberration view, various aberrations including distortion and the like, are satisfactorily corrected in all Examples.

The present invention is structured as described above, therefore, the following effects can be obtained: a zoom lens whose overall length is reduced while its variable magnification ratio is kept, without deteriorating the aberration, can be provided; and further, a digital still camera, video camera, etc., having the zoom lens can also be provided. Further, according to the zoom lens of the present invention, a zoom lens can be obtained, in which a contribution to the variable magnification of each lens group and a distribution of the refracting power to each lens group are appropriately made; which is compact such that a ratio of the overall length of the lens to a diagonal length of the image plane is 7–7.8, although the number of component lenses is 8–10, the number is considerably small; and various aberrations including distortion and the like, are finely corrected as can be seen in each aberration view.

Further, according to the zoom lens of the present invention, a lens, whose third lens group has the image forming performance which is scarcely lowered by the eccentricity, can be obtained even by a simple assembling process, and a zoom lens having good image forming performance can be obtained. Further, plastic lenses are adopted, and a high performance lens which is low cost and scarcely influenced by the temperature variation, can be obtained. Further, the weight of focusing lens groups is reduced, thereby, the size of the driving device for focusing can also be reduced, and a compact camera can be obtained.

According to the zoom lens of the present invention, a zoom lens in which plastic lenses are effectively used, and which is low cost, high performance, and is easily assembled, can be obtained.

Further, according to the present invention, a zoom lens in which a glass lens and a plastic lens are appropriately combined, and whose cost is low, and which is hardly influenced by the temperature variation, can be obtained.

According to the zoom lens of the present invention, a zoom lens can be obtained by which macro photographing, in which a magnification ratio for image formation is more than 1/10 at the wide angle end, is possible.

Disclosed embodiment can be varied by a skilled person without departing from the spirit and scope of the invention.

What is claimed is:

1. A zoom lens, comprising:
   a plurality of lens groups, wherein the plurality of lens groups consists of, in the order named from an object side:
   (a) a first lens group having a positive focal length;
   (b) a second lens group having a negative focal length and at least one positive lens; and
   (c) a third lens group having a positive focal length,
   wherein a magnification is changed by moving said second and third lens groups in an optical axis direction of said zoom lens, and wherein the following condition is satisfied, $$3.0 < Lt/(L\sqrt{Z}) < 6.0$$

where Lt represents a distance between a lens surface closest to the object side of said first lens group and an image plane, L represents a diagonal length of the image plane, and Z represents a variable magnification ratio showing a ratio of a focal length at a wide angle end to a focal length at a telephoto end.

2. The zoom lens of claim 1, wherein the variable magnification ratio representing the ratio of the focal length at the wide angle end to the focal length at the telephoto end, is not less than 2.5, and satisfies the following condition, $$0.60 < (\beta_{2T}/\beta_{2W}) \cdot (\beta_{3W}/\beta_{3T}) < 4.0$$

where $\beta_{2T}$ represents a lateral magnification of said second lens group at a telephoto end, $\beta_{2W}$ represents a lateral magnification of said second lens group at a wide angle end, $\beta_{3T}$ represents a lateral magnification of said third lens group at the telephoto end, and $\beta_{3W}$ represents a lateral magnification of said third lens group at the wide angle end.

3. The zoom lens of claim 2, wherein the following conditions are satisfied:

$$0.60 < (\beta_{2T}/\beta_{2W}) \cdot (\beta_{3W}/\beta_{3T}) < 1.2$$

$$30° w_W$$

where $w_W$ represents a half field angle at the wide angle end.

4. The zoom lens of claim 2, wherein said third lens group includes at least three lenses and at least one lens among said third lens group is negative lens, and at least one surface among surfaces of said third lens group is aspherical.

5. The zoom lens of claim 2, wherein the following conditions are satisfied:

$$1.4 < (\beta_{2T}/\beta_{2W}) \cdot (\beta_{3W}/\beta_{3T}) < 4.0$$

$$w_T < 10°$$

where $w_T$ represents a half field angle at the telephoto end.

6. The zoom lens of claim 2, wherein the following conditions are satisfied:

$$0.75 < (\beta_{2T}/\beta_{2W}) \cdot (\beta_{3W}/\beta_{3T}) < 4.0$$

$$-0.77 < \beta_{3T} < -0.42$$

$$0.1 < f_W/f_1 < 0.22$$

where $f_1$ represents a focal length of said first lens group, and $f_W$ represents a focal length of an overall system of said zoom lens at the wide angle end.

7. The zoom lens of claim 2, wherein the following conditions are satisfied:

$$1.0 < (\beta_{2T}/\beta_{2W}) \cdot (\beta_{3W}/\beta_{3T}) < 4.0.$$

$$-0.69 < \beta_{3T} < -0.38.$$

8. The zoom lens of claim 7, wherein the following conditions are satisfied:

$$0.12 < f_W/f_1 < 0.25$$

$$-0.9 < f_W/f_2 < -0.4$$

$$2.5 < f_1/f_3 < 4.0$$

where $f_1$ represents a focal length of said first lens group, $f_2$ represents a focal length of said second lens group, $f_3$ represents a focal length of said third lens group, and $f_W$ represents a focal length of an overall system of said zoom lens at the wide angle end.

9. The zoom lens of claim 8, wherein said first lens group comprises, in the order named from the object side, a negative meniscus lens, at least one positive lens; said second lens group comprises, in the order named from the object side, two negative lenses and one positive lens; and said third lens group comprises, in the order named from the object side, a positive lens, a negative lens, and at least one positive lens.

10. The zoom lens of claim 2, wherein the following conditions are satisfied:

$$1.2 < (\beta_{2T}/\beta_{2W}) \cdot (\beta_{3W}/\beta_{3T}) < 3.0$$

$$-0.65 < \beta_{3T} < -0.4.$$

11. The zoom lens of claim 10, wherein the following conditions are satisfied:

$$0.13 < f_W/f_1 < 0.22$$

$$-0.82 < f_W/f_2 < -0.5$$

$$2.8 f_1/f_3 < 3.7$$

where $f_1$, represents a focal length of said first lens group, $f_2$ represents a focal length of said second lens group, $f_3$ represents a focal length of said third lens group, and $f_W$ represents a focal length of an overall system of said zoom lens at the wide angle end.

12. The zoom lens of claim 1, wherein said third lens group has a (3-a)th lens sub-group in which a positive lens and a negative lens are cemented together, and a (3-b)th lens sub-group having a positive refracting power provided adjacent to said (3-a)th lens sub-group on the image side, and wherein said (3-b)th lens sub-group has a positive lens.

13. The zoom lens of claim 12, wherein at least one surface of said (3-a)th lens sub-group is aspherical.

14. The zoom lens of claim 12, wherein all of said (3-b)th lens sub-group are made of plastic lenses, and the following condition is satisfied $$|f_W/f_{3-a}| < 0.06$$

where $f_{3-a}$ represents a focal length of said (3-a)th lens sub-group, and $f_W$ represents a focal length at a wide angle end of an overall system of said zoom lens.

15. The zoom lens of claim 12, wherein the following condition is satisfied:

$$0.05 < S/\{L^2(1/r_a - 1/r_b)\} < 0.2$$

where $r_a$ represents a radius of curvature of a surface of said (3-a)th lens sub-group provided closest to the image side, $r_b$ represents a radius of curvature of a surface of said (3-b)th lens sub-group provided closest to the object side, S represents a distance between said (3-a)th lens sub-group and said (3-b)th lens sub-group, and L represents a diagonal length of an image plane.

16. The zoom lens of claim 12, wherein said third lens group has a refraction surface located closest to the object side of said (3-b)th lens sub-group in contact with a lens located closest to the image side of said (3-a)th lens sub-group.

17. The zoom lens of claim 1, wherein said second lens group has a negative (2-1)th lens having a concave surface facing an image side, a negative (2-2)th lens made of plastic having a concave surface facing the object side, and a positive (2-3)th lens made of plastic, and wherein said (2-2)th lens and said (2-3)th lens are cemented together.

18. The zoom lens of claim 17, wherein the following condition is satisfied:

$$-0.90 < f_W/f_2 < -0.4$$

where $f_W$ represents a focal length at a wide angle end of an overall system of said zoom lens, and $f_2$ represents a focal length of said second lens group.

19. The zoom lens of claim 17, wherein both said concave surface facing the object side of said (2-2)th lens and a surface facing the image side of said (2-3)th lens are aspherical surfaces each in which as a point on said aspherical surface 13 moved away from an optical axis of said lens toward a periphery thereof, a refracting power thereof increases, and the following conditions are satisfied:

$$v_{22} > 50$$

$$v_{23} < 35$$

where $v_{22}$ represents an Abbe's number of said (2-2)th lens, and $v_{23}$ represents an Abbe's number of said (2-3)th lens.

20. The zoom lens of claim 17, wherein the following condition is satisfied:

$$|f_W/f_{2R}| < 0.06$$

where $f_W$ represents a focal length of an overall system of said zoom lens at the wide angle end, and $f_{2R}$ represents a composite focal length of said (2-2)th and (2-3)th lenses.

21. The zoom lens of claim 12,
wherein said second lens group has a negative (2-1)th lens having a concave surface facing an image side, a negative (2-2)th lens made of plastic having a concave surface facing the object side, and a bi-convex (2-3)th lens made of plastic;

wherein the lenses of said (3-a)th lens sub-group are made of plastic, and at least one lens of lenses included in said first lens group, said (2-1)th lens and said positive lens included in said (3-b)th lens sub-group, is made of glass, and wherein at least one surface of said (3-a)th lens sub-group, and the object side surface of said (2-2)th lens and at least one surface of said (2-3)th lens, are aspherical surfaces.

22. The zoom lens of claim 21, wherein the following conditions are satisfied:

$|f_W/f_{3-a}|<0.06$ $|f_W/f_{2R}|<0.06$ where $f_W$ represents a focal length of an overall system of said zoom lens at the wide angle end, $f_{2R}$ represents a composite focal length of said (2-2)th and (2-3)th lenses, and $f_{3-a}$ represents a composite focal length of said (3-a)th lens subgroup.

23. The zoom lens of claim 21, wherein the following conditions are satisfied:

$-0.69<\beta_{3T}<-0.38$ $1.0<(\beta_{2T}/\beta_{2W})\cdot(\beta_{3W}/\beta_{3T})<4.0$ where $\beta_{2T}$ represents lateral magnification of said second lens group at a telephoto end, $\beta_{2W}$ represents a lateral magnification of said second lens group at a wide angle end, $\beta_{3T}$ represents a lateral magnification of said third lens group at the telephoto end, and $\beta_{3W}$ represents a lateral magnification of said third lens at the wide angle end.

24. The zoom lens of claim 21, wherein when a focusing operation from the telephoto end to the wide angle end is carried out, said third lens group is moved.

25. The zoom lens of claim 1, wherein said second lens group consists of, in the order named from the object side, two negative lenses and one positive lens.

26. The zoom lens of claim 25, wherein said two negative lenses are (2-1)th and (2-2)th lens, in the order named from the object side and said one positive lens is (2-3)th lens, and wherein the following conditions are satisfied;

$v_{22}>50$ $v_{23}<35$ where $v_{22}$ represents an Abbe's number of said (2-2)th lens, and $v_{23}$ represents an Abbe's number of said (2-3)th lens.

27. The zoom lens of claim 1, wherein said third lens group comprises, in the order named from the object side, a positive lens, a negative lens, and at least one positive lens.

28. The zoom lens of claim 1, wherein said first lens group comprises, in the order named from the object side, a negative meniscus lens, at least one positive lens; said second lens group comprises, in the order named from the object side, two negative lenses and one positive lens; and said third lens group comprises, in the order named from the object side, a positive lens, a negative lens, and at least one positive lens.

29. The zoom lens of claim 1, wherein said second lens group has a negative (2-1)th lens having a concave surface facing an image side, a negative (2-2)th lens made of plastic having a concave surface facing the object side, and a positive (2-3)th lens made of plastic.

30. The zoom lens of claim 1, wherein a magnification is changed by moving said second and third lens groups in an optical axis direction of said zoom lens while keeping the first group stationary.

31. A digital still camera, comprising:
an image sensor for changing optical information to an electrical signal; and
a zoom lens comprising a plurality of lens groups, wherein the plurality of lens groups consists of, in the order named from an object side:
(a) a first lens group having a positive focal length;
(b) a second lens group having a negative focal length and at least one positive lens; and
(c) a third lens group having a positive focal length, wherein a magnification is changed by moving said second and third lens groups in an optical axis direction of said zoom lens, and wherein the following condition is satisfied, $3.0<Lt/(L\sqrt{Z})<6.0$ where Lt represents a distance between a lens surface closest to the object side of said first lens group and an image plane, L represents a diagonal length of the image plane, and Z represents a variable magnification ratio showing a ratio of a focal length at a wide angle end to a focal length at a telephoto end.

32. The digital still camera of claim 31,
wherein the variable magnification ration representing the ratio of the focal length at the wide angle end to the focal length at the telephoto end, is not less than 2.5, and satisfies the following condition, $0.60<(\beta_{2T}/\beta_{2W})\cdot(\beta_{3W}/\beta_{3T})4.0$ where βhd 2Trepresents a lateral magnification of said second lens group at a telephoto end, $\beta_{2W}$ represents a lateral magnification of said second lens group at a wide angle end, $\beta_{3T}$ represents a lateral magnification of said third lens group at the telephoto end, and $\beta_{3W}$ represents a lateral magnification of said third lens group at the wide angle end.

33. The digital still camera of claim 31, wherein said third lens group has a (3-a)th lens sub-group in which a positive lens and a negative lens are cemented together, and a (3-b)th lens sub-group having a positive refracting power provided adjacent to said (3-a)th lens sub-group on the image side, and
wherein said (3-b)th lens sub-group has a positive lens.

34. A video camera, comprising:
an image sensor for changing optical information to an electrical signal; and
a zoom lens comprising, in the order named from an object side:
(a) a first lens group having a positive focal length,
(b) a second lens group having a negative focal length and comprising at least one positive lens; and
(c) a third lens group having a positive focal length, wherein a magnification is changed by moving said second and third lens groups in an optical axis direction of said zoom lens, and wherein the following condition is satisfied, $3.0<Lt/(L\sqrt{Z})<6.0$ where Lt represents a distance between a lens surface closest to the object side of said first lens group and an image plane, L represents a diagonal length of the image plane, and Z represents a variable magnification ratio showing a ratio of a focal length at a wide angle end to a focal length at a telephoto end.

35. The video camera of claim 34,
wherein the variable magnification ratio representing the ratio of the focal length at the wide end to the focal length at the telephoto end, is not less than 2.5, and satisfies the following condition, $0.60<(\beta_{2T}/\beta_{2W})\cdot(\beta_{3W}/(\beta_{3T})<4.0$ where $\beta_{2T}$ represents a lateral magnification of said second lens group at a telephoto end, $\beta_{2W}$ represents a lateral magnification of said second lens group at a wide angle end, $\beta_{3T}$ represents a lateral magnification of said third lens group at the telephoto end, and $\beta_{3W}$ represents a lateral magnification of said third lens group at the wide angle end.

36. The video camera of claim 34, wherein said third lens group has a (3-a)th lens sub-group in which a positive lens and a negative lens are cemented together, and a (3-b)th lens sub-group having a positive refracting power provided adjacent to said (3-a)th lens sub-group on the image side, and wherein said (3-b)th lens sub-group has a positive lens.

* * * * *

UNITED STATES PATENT AND TRADEMARK OFFICE
CERTIFICATE OF CORRECTION

PATENT NO.   : 6,307,685 B1
DATED        : October 23, 2001
INVENTOR(S)  : Nobuyoshi Mori et al.

It is certified that error appears in the above-identified patent and that said Letters Patent is hereby corrected as shown below:

Column 26,
Line 35, "($\beta_{2T}\beta_{2W}$)" should read -- ($\beta_{2T}/\beta_{2W}$) --.
Line 47, "30º$w_w$" should read -- 30º < $w_w$ --.
Line 65, "-0.77<$\beta_{3T}$—0.42" should read -- -0.77 < $\beta_{3T}$ < -0.42 --.

Column 27,
Line 43, "2.8$f_1/f_3$<3.7" should read -- 2.8 <$f_1/f_3$ < 3.7 --.

Column 28,
Line 21, "positive(2-3)th" should read -- positive (2-3)th --.
Line 53, "(2-1 )th" should read -- (2-1)th --.

Column 29,
Line 11, "subgroup" should read -- sub-group --.

Column 30,
Line 17, "ration" should read -- ratio --.
Line 24, "βhd 2Trepresents" should read -- $\beta_{2T}$ represents --.
Line 41, "comprising, in" should read -- comprising a plurality of lens groups, wherein the plurality of lens groups consists of, in --.
Line 43, "length," should read -- length; --.
Line 64, "($\beta_{3W}/(\beta_{3T}$)" should read -- ($\beta_{3W}/\beta_{3T}$) --.

Signed and Sealed this

Second Day of December, 2003

JAMES E. ROGAN
*Director of the United States Patent and Trademark Office*